United States Patent [19]
Woodland

[11] Patent Number: 6,056,237
[45] Date of Patent: May 2, 2000

[54] SONOTUBE COMPATIBLE UNMANNED AERIAL VEHICLE AND SYSTEM

[76] Inventor: Richard L. K. Woodland, 562 Fermoy Place, Victoria, B.C., Canada, V8Z 6N2

[21] Appl. No.: 08/882,368

[22] Filed: Jun. 25, 1997

[51] Int. Cl.[7] .................. F41G 7/00; B64C 1/00
[52] U.S. Cl. .................................. 244/3.15; 244/120
[58] Field of Search ............ 244/3.15; D12/16.1; 102/393, 405; 114/21.2, 21.1, 21.3, 316; 89/1.8, 1.11, 1.54, 1.55

[56] References Cited

U.S. PATENT DOCUMENTS

| | | | |
|---|---|---|---|
| D. 317,003 | 5/1991 | Tribe et al. | D12/333 |
| 2,992,794 | 7/1961 | Boyd | 244/3.15 |
| 3,916,759 | 11/1975 | Jones et al. | 89/1.814 |
| 5,615,847 | 4/1997 | Bourlett | 244/3.15 |

*Primary Examiner*—Peter M. Poon
*Assistant Examiner*—Charles R Ducker, Jr.
*Attorney, Agent, or Firm*—Roddy M. Bullock

[57] ABSTRACT

The present invention is generally comprised of a sonotube-compatible unmanned aerial vehicle apparatus, hereinafter referred to as a UAV, and systems for launch and control of the UAV. The UAV is generally comprised of modular sections including a nose section, a payload section, a wing and fuel tank section, and a powerplant section. The modular sections are attached to adjacent sections by uniform lock sealing rings and related components. The present invention comprises an apparatus enabling very small, man portable, ballistically launched, autonomously or semi-autonomously controlled vehicle to be deployed with preprogrammed, communicated, or telemetry mission programming. A wide range of payload packages, including emergency supplies, sensors, and antenna assemblies, may be carried, used or deployed in flight. Man-portable operation is accomplished by the use of a launch canister apparatus. The launch canister comprises retractable launch stabilizing legs, turbine engine exhaust orifices, and various antennas. The launch canister apparatus alternatively comprises a modified type "A", "B", or "C" sonotube launch canister. The system of the invention also comprises a portable Command, Control, Communications, Computer, and Intelligence (C4I) control and sensing analysis console. The console is preferably ruggedized, waterproof, shockproof, and comprises necessary control and analysis computers, input/output devices, antennas, and related hardware and software for vehicle and mission control. A C4I console and/or launch canisters may be transported by means of a backpack adapted for man portability.

26 Claims, 23 Drawing Sheets

SONOTUBE COMPATIBLE UNMANNED AERIAL VEHICLE AND SYSTEM

FIELD OF THE INVENTION

This invention relates to unmanned aerial vehicles. In particular, the present invention relates to sonotube-compatible unmanned aerial vehicles adaptable to land, air, sea and submarine launching, and systems for deployment.

BACKGROUND OF THE INVENTION

In various military, paramilitary, or civil emergency environments, there are certain applications that require aerial response capabilities. For example, in a rescue at sea environment, aerial sensing, targeting, detection and communication capability can aid persons in peril, either directly or by aiding rescuers. In particular, time sensitive emergency operations require highly accurate, aerial sensing and data transmission, preferably delivered by highly mobile, man-portable, GPS-referenced, flexible aerial platforms capable of rapidly launching various payloads and sensors, and being readily adaptable to changes in mission objectives and payload requirements.

In related applications, surveillance capabilities which are essential to policing or peace-keeping, but not generally available to the average peace officer or foot soldier, would include logistical or transit route survey, damage assessment, targeting, threat, and weather analysis. Currently, the results of aerial surveillance and intelligence functions in these area are typically disseminated through a long chain of intelligence gathering entities which delay the process to such an extent that the information is often obsolete by the time tactical units receive it.

One method of providing aerial sensing and data communications in hostile or emergency environments is by use of unmanned aerial vehicles (UAVs). Currently small UAVs are being used by various governments to achieve some of the benefits of such a vehicle, primarily in military and paramilitary operations. Among these systems are the Thompson-CSF Epervier, the AeroVironment FQM-151 A Pointer, the BAI Javelin, and the BAI BQM-147A Exdrone. Other similar vehicles include the U.S. Navy's Improved Tactical Air Launched Decoy (ITALD), or the U.S. Air Force's Miniature Air Launched Decoys (MALD). As disclosed in U.S. Pat. No. 5,112,006, issued May 12, 1992 to Palmer, various air deployed decoys with sophisticated electronics do exist. But decoys of this type are typically costly, and of such unwieldy size such that they occupy an external aircraft hardpoint normally used for munitions or sensors. Additionally, such decoys necessitate costly airframe modifications to mount special launching mechanisms. While otherwise successful in many respects, these vehicles are also somewhat limited in various operating parameters, including limited range, speed, observability, payload, mission modularity, portability and telemetry. Also the cost of such systems is generally prohibitive, since the vehicles must often of necessity be expendable.

One of the most important applications for UAVs is the area of search and rescue operations. Often, climactic conditions are such that rescuers are prevented from reaching the persons in peril. In many civil response scenarios rescuers are hampered in their rescue efforts by natural forces such as high winds, waves, and fires, or consequences of natural disasters such as broken gas lines, severed communications, and flood or earthquake damage. However, a UAV with suitable payload packages could detect the persons in peril, and effect delivery of rescue equipment or other life-saving items. Although helicopters may be available in these situations, they are usually over-tasked doing medivac missions and often cannot respond to the flood of tactical damage assessment issues which must be addressed.

In battlefield and civilian situations where the unseen presence of toxic gases or biological warfare components can prove lethal, a rapidly configured and deployed aerial sampling and detection system could enable proper and effective evacuation efforts, thereby saving many lives. In non-critical research applications, controlled atmospheric/environmental sampling on a regular basis could yield geo-referenced data of a specific column of air space. Additionally, a UAV would be particularly useful under severe atmospheric conditions such as tornadoes or hurricanes requiring direct sampling to yield accurate empirical data without placing climatological researchers at risk.

Important design considerations for a preferred UAV relate to precise micro GPS-inertial navigation systems, uninterruptible telemetry, undetectable telemetry, fully autonomous mission programming, micro antenna assemblies, improved satellite relay techniques, and rapidly installed miniature sensors, weapons, and other payload assemblies. However, existing UAVs fall short of being totally acceptable in one or all of the categories listed. In addition, current UAV products in the smaller aircraft range do not incorporate a self-contained ballistic tube launch mechanism which enables the vehicle to be launched and controlled from multiple launch platforms by a single individual.

There are sonotube compatible inflated aeronautical type products in existence, as disclosed in U.S. Pat. No. 5,566, 908, issued Jan. 30, 1995 to Greenhalgh, which discloses a sonotube launched, inflatable membraneous wing. The Greenhalgh wing acts as a steerable glider ejected from the sonotube canister after leaving the aircraft. However, this design is not capable of powered flight, and therefore its inherent range, speed, maximum altitude, flight controls, accessories, and sensor payload carrying capabilities are less than ideal for many operations.

In general, existing UAVs are manpower intensive to launch and control, are of unwieldy size or weight for man portable applications, and do not permit ready field alterations of vehicle sensor or payload systems. Additionally, in general, existing UAVs are complex, costly, have severely limited range, and altitude. Further, existing UAVs generally lack the level of autonomy for flexible, dynamic vehicle control in response to various inputs and sensor data.

Further, no lightweight UAV currently available employs a uniform deployment method which enables launch of the vehicle from aircraft, ships, and submarines without substantial modification to the respective platforms, such as aircraft fuselages, ship hulls, pressure vessels and the like.

Additionally, existing UAVs lack acceptable subsurface launch capability. Particularly important for subsurface launch capability is the ability to use data burst or spread spectrum telemetric communications that would not disclose the location of a submersible launch station while still remaining sonotube compatible. For example, although the U.S. Navy's Amber torpedo tube launched UAV was capable of achieving a submerged launch and RF telemetry capability, the vehicle was not miniature, expendable, or man portable, and did not possess uniform launch standardization or modularity within a sonotube format.

Accordingly, there is a continuing unaddressed sonotube compatible UAV capable of undertaking high speed, low speed, low altitude, and/or high altitude missions within the aforementioned military, paramilitary, and emergency response scenarios.

Further, there is need for a miniature, man portable, air, land, and sea launched UAV capable of autonomous or remote launch and flight control.

Additionally, there is a need for a modular, field configurable UAV capable of a wide range of mission-specific launch, flight, and payload requirements.

SUMMARY OF THE INVENTION

The present invention is generally comprised of a sonotube-compatible, micro-miniature, unmanned aerial vehicle apparatus, hereinafter referred to as a UAV, and systems for launch and control of the UAV. The UAV is generally comprised of modular sections including a nose section, a payload section, a wing and fuel tank section, and a powerplant section. The modular sections are attached to adjacent sections by uniform lock sealing rings and related components. The present invention comprises an apparatus enabling very small, man portable, ballistically launched, autonomously or semi-autonomously controlled vehicle to be deployed with preprogrammed, communicated, or telemetry mission programming. A wide range of payload packages, including emergency supplies, sensors, and antenna assemblies, may be carried, used or deployed in flight.

The nose section of the UAV can accommodate either fixed forward, down, side or upward mounted sensors, optionally mounted on a gimbaled turret. The nose section typically houses a control module comprised of a system computer, transceiver and telemetry means, and navigation electronics.

The payload section is comprised of an airframe casing housing a rotary payload launcher or gravity payload release mechanism with sequential release doors for payload packages. In particular, payload rotary launcher is designed for full length, half length, or quarter length size payloads. The payload section may also comprise a fixed sensor or photographic payload which is not jettisoned from the UAV.

The wing and fuel tank section is comprised of an airframe casing housing means for fuel storage and delivery, and a pair of retracted two sequence, or single sequence, spring-actuated wing assemblies. Wing assemblies are typically equipped with aileron control surfaces and spring loaded winglets on the outboard wing sections. The wings are modular and can be field replaced or repositioned with other types of wings for higher, or lower speed aeronautical, or payload weight and balance considerations.

The powerplant section is comprised of an airframe casing having air intake orifices for air supply to an internally-housed turbine. Ram air electrical generators provide power for the vehicle and a miniature turbojet engine supplies power for cruise flight. Launch is enabled and assisted by a plurality of Rocket Assisted Take Off (RATO) units. The powerplant section also houses a plurality of axially-arrayed two-sequence, spring actuated, control fins with elevon control surfaces.

Man-portable operation is accomplished by the use of a launch canister apparatus. The launch canister comprises retractable launch stabilizing legs, turbine engine exhaust orifices, and various antennas. The launch canister apparatus alternatively comprises a modified type "A", "B", or "C" sonotube launch canister.

The system of the invention also comprises a portable Command, Control, Communications, Computer, and Intelligence (C4I) control and sensing analysis console. The console is preferably ruggedized, waterproof, shockproof, and comprises necessary control and analysis computers, input/output devices, antennas, and related hardware and software for vehicle and mission control. A C4I console and/or launch canisters may be transported by means of a backpack adapted for man portability.

The system of the invention also comprises a land, sea, sub-sea, or air deployed precision positioning remote launch and telemetry systems. The systems are capable of launching multiple sonotube compatible vehicles either autonomously or under direct remote control.

BRIEF DESCRIPTION OF THE DRAWINGS

Additional attributes of the current invention will become apparent to those skilled in the art to which the current invention relates from the following specification with reference to the accompanying drawings, in which.

DETAILED DESCRIPTION OF THE INVENTION

Unmanned Aerial Vehicle And Related Components

Figure 1:
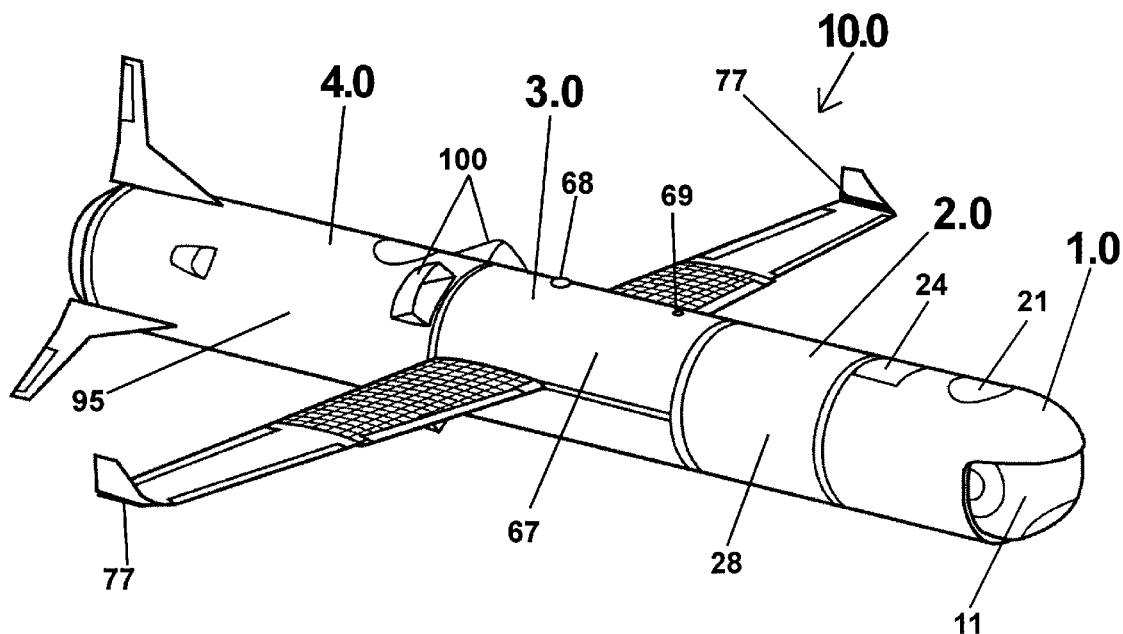
FIG. 1 is a frontal perspective view of a UAV of the present invention.

As shown in FIG. 1, the micro-miniature unmanned aerial vehicle 10.0 of the present invention is generally comprised of a sonotube-compatible airframe comprised of modular units including a nose section 1.0, a payload section 2.0, a wing and fuel tank section 3.0, and a powerplant section 4.0. By "micro-miniature" is meant a UAV generally small enough to be man portable and sonotube compatible. By "sonotube-compatible" is meant that the airframe is sized so as to fit within, and be launched from, type "A", "B", or "C" sonotubes. By "modular" is meant that each of the major units is removable and replaceable independent of the other units, and may be optimized to particular performance requirements of specific uses. Many of the parts and components of the present invention are hereinafter described as being "assemblies." As used herein, the word "assembly" or "assemblies" means the totality of related parts and pieces related to a given component and its operability and is not to be considered as limiting to a particular part, piece, or operation.

Figure 2:
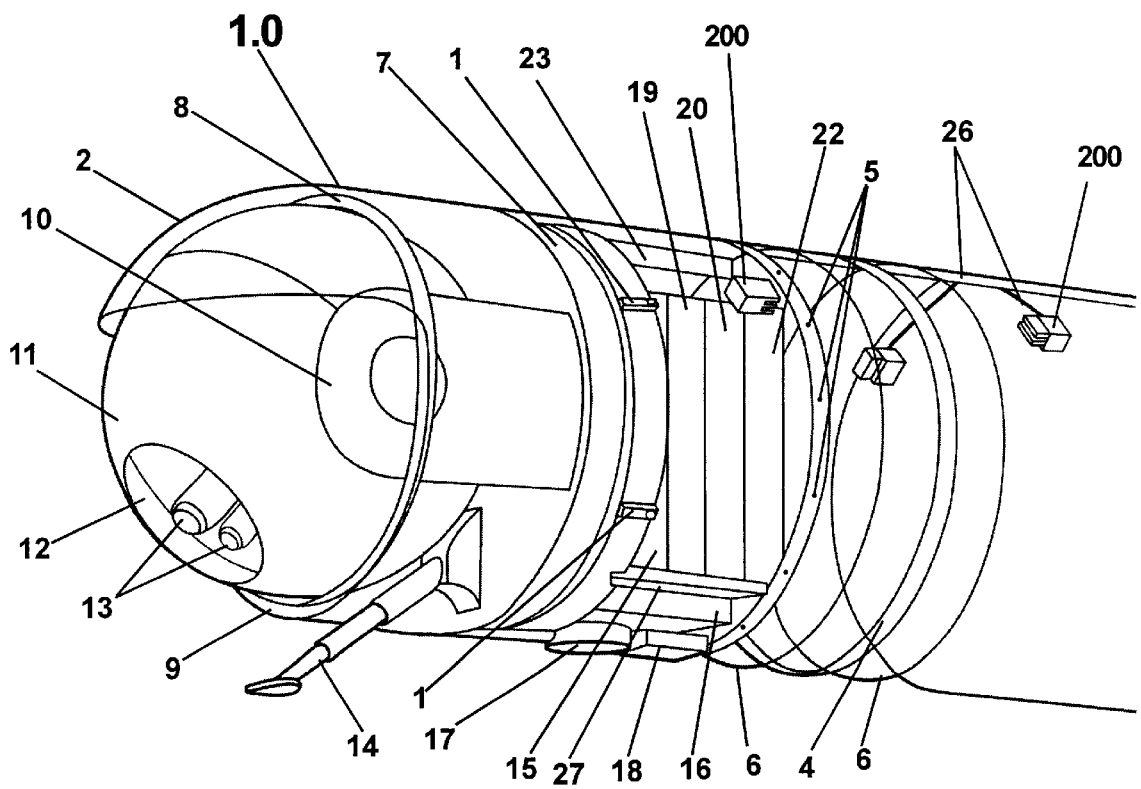
FIG. 2 is a frontal transparent perspective view of a gimbaled nose section assembly of a UAV of the present invention.
Figure 3:
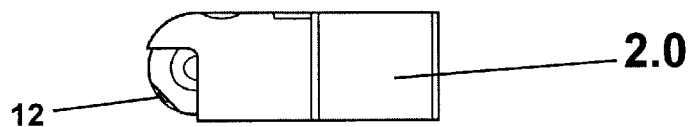
FIG. 3 is a side view of a nose section of a UAV of the present invention having a gimbaled turret attached to a ½ sectional payload section.

In a preferred embodiment, the airframe of the present invention incorporates an aerodynamically engineered, cylindrical, missile-shaped, sectional external airframe fabricated from aluminum or other lightweight alloy, or other composite synthetic materials which will protect sensors and internal vehicle components from shock, vibration, or other environmental damage. The airframe is also designed to minimize aerodynamic drag and maximize internal vehicle space. As shown in FIGS. 1–3, a generally circular cylindrical missile-shaped design is the preferred shape for meeting the design requirements of the airframe. Whereas the airframe is considered here, with reference to FIGS. 1–3, in its overall configuration, it is understood that in a narrower sense, the airframe is actually comprised of sections of airframe, each section a modular unit comprising a section of the overall airframe.

Modular airframe sections may be joined in any suitable manner, but are preferably attached to adjacent units by threaded sealing rings, described in detail with reference to nose section 1.0 below. Although not redundantly described for each unit, it is understood that each modular airframe unit is preferably attached by similar attachment means. Each modular unit, with its section of the overall airframe, will be discussed in detail below.

Nose Section 1.0

As shown in FIGS. 1–6, and in detail in FIG. 2, nose section 1.0 is the forward-most modular unit of the UAV 11.0 of the present invention. By "forward-most" is meant the end of the vehicle opposite the power plant unit described in a later section. The forward-most end of the vehicle is the end that is the leading section in flight when the UAV is in flight. Nose section 1.0 houses various vehicle sensor and mission electronics, computer controls, and antenna elements.

In a preferred embodiment nose section 1.0 is connected to other airframe sections by means of a metallic alloy or composite synthetic airframe section lock sealing ring 4, as shown in FIG. 2. Once connected, nose section 1.0 is secured in place by airframe section lock sealing ring screws 5. The joint between the nose section 1.0 and adjacent airframe sections is preferably made waterproof by an airframe section O-ring gasket 6, or other suitable sealing means. As mentioned above, a similar means of attachment is used for all the modular units of the UAV 10.0 of the present invention.

Figure 4:
FIG. 4 is a side view of a nose section of a UAV of the present invention having a thermal sensor in a flat surface nose.
Figure 5:
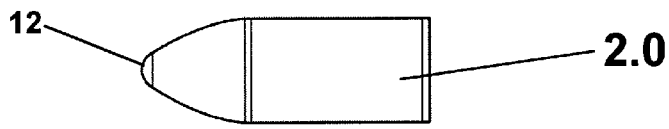
FIG. 5 is a side view of a nose section of a UAV of the present invention having a video camera in the nose cone.
Figure 6:
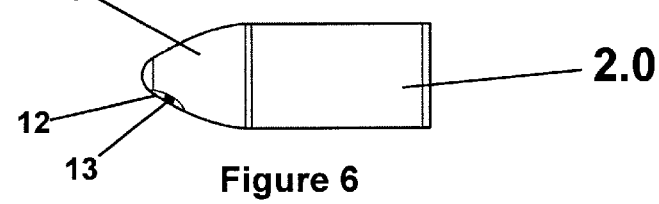
FIG. 6 is a side view of a nose section of a UAV of the present invention having a video camera mounted underneath the nose cone.

As shown in FIGS. 3–6, nose section 1.0 may take various forms, depending on the particular use of the UAV. For example, as shown in FIG. 6, nose section 1.0 may comprise a fixed sensor nose casing 3, the fixed nose casing 3 housing optical or nonoptical sensors 13, also shown in FIG. 2. Sensors 13 are preferably miniature sensors, such as those developed by DARPA and the U.S. Army Night Visions and Electronics Sensors Directorate. For example, sensors 13 may be a "Low Cost Uncooled Sensor Prototype" (LOCUSP) thermal vision system, or the Lockheed-Martin "MICRO-FLIR" manufactured by Fairchild Systems, USA, or other existing micro FLIR systems typical of those manufactured by Raytheon or Hughes Electro Optics, USA. Other optical sensors adaptable as sensors 13 include daylight video, fourth generation Low Light Television (LLTV), all light television (ALLTV) night vision systems typical of those developed by ITT Electronics USA. Sensors 13 may also include laser ranging and targeting systems of conventional design adapted from the Lockheed-Martin AN/AAQ-13/14 LANTIRN Sharpshooter type systems, or other long range laser ranging systems developed by ALST Lasers of Orlando, Fla., USA. Sensors 13 are protected from environment elements by an optical or electronic external lens covering 12 of suitable material and shape.

Rather than comprising a fixed sensor nose casing 3, nose section 1.0 preferably comprises a gimbaled sensor nose casing 2, as shown in FIGS. 2 and 3. Gimbaled sensor nose casing 2 provides a mounting surface for a gimbaled orb azimuth tracking assembly 7, a gimbaled orb bearing support assembly 8, a gimbaled orb rubber sealing ring 9, a gimbaled orb elevation actuator and fastening assembly 10. Elevation actuator and fastening assembly 10 provides a mounting mechanism for the gimbaled orb casing assembly 11, which in turn provides an internal mounting surface to house various optical and electronic sensors, as discussed above with relation to the fixed sensor nose cone 3.

Alternatively, nose section 1.0 may comprise a flattened nose cone surface as shown in FIG. 4, or a transparent lens-covered nose cone as shown in FIG. 5. The style and functional capabilities of nose section are almost limitless, and the embodiments shown are not to be understood as limiting in scope.

The various sensors housed in nose section 1.0 are interfaced to, and controlled by an onboard systems computer 15, as shown in FIG. 2. Systems computer 15 preferably uses a processor, or processors, typical of existing systems manufactured by Intel, Motorola, Sun, or other computer processor manufacturers. Systems computer 15 preferably implements autonomously programmed higher protocol flight responses from data received by a lower level flight data processor 16, typical of existing systems manufactured by Rockwell-Collins Avionics of California, USA. Flight data processor 16 receives information from various outputs, including, but not limited to, a static port 17 of existing design, an altimeter radar chip 18, typical of those developed and in current use by Lawrence Livermore National laboratories, and a micro miniature inertial Global Positioning System (GPS) based navigation system 19. Inertial GPS navigation system 19 is preferably typical of those developed by Draper Laboratories (USA) and DARPA for Precision Guided Munitions which interface with GPS card(s) 20, to receive data from GPS antenna(s) 21.

Inertial GPS navigation system 19 relays flight data to systems computer 15, which in turn processes the flight data in conjunction with other mission payload data for transmission through a satellite transceiver telemetry card 22, and/or RF transceiver telemetry card 23, typical of Type "A", "B", or "C" sonotube compliant Platform Terminal Transmitters (PTT's) manufactured by Seimac Lt. of Nova Scotia, Canada, or Pragmatic Communications Systems Inc. of San Jose, Calif., USA. Other suitable telemetry cards include cards typical of those used by General Atomics Aeronautical Systems of CA, USA, or Aurora Flight Sciences of Manassas, Va., USA. Telemetry cards 22 and/or 23 may transmit and receive video, audio, or data telemetry and communications over military or civilian satellite relay systems, such as INMARSAT, MILSAT, ORBCOM, M-STAR, or pending IRIDIUM, GOES-8, MSAT, or other satellite systems.

Figure 21:
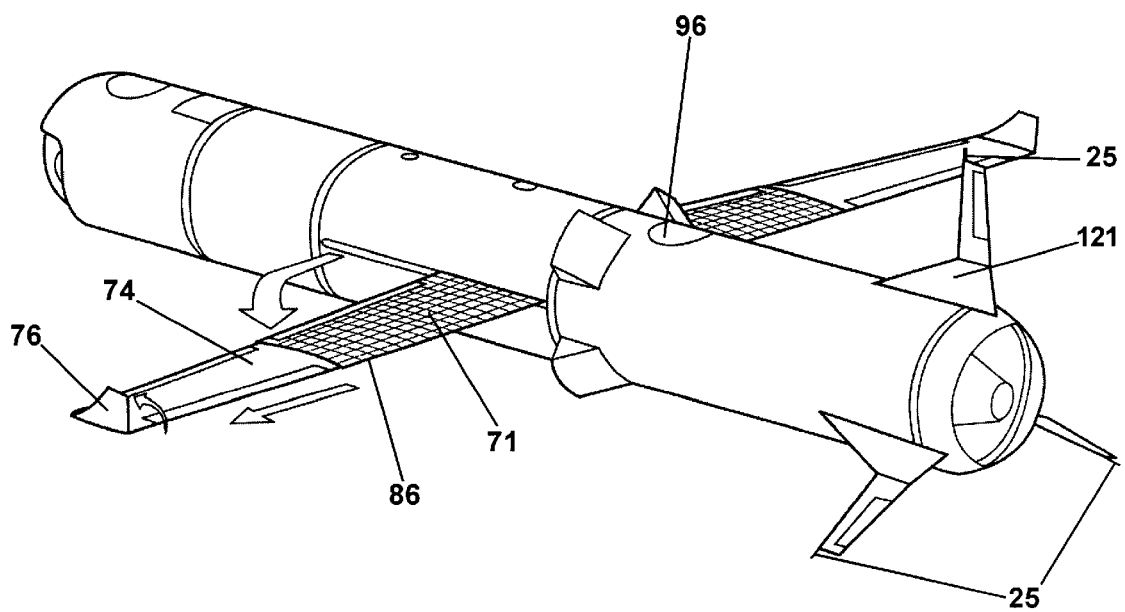
FIG. 21 is a rear perspective view of axially-arrayed control fins in fully extended position, and wing assemblies in fully extended position on a UAV of the present invention.
Figure 23:
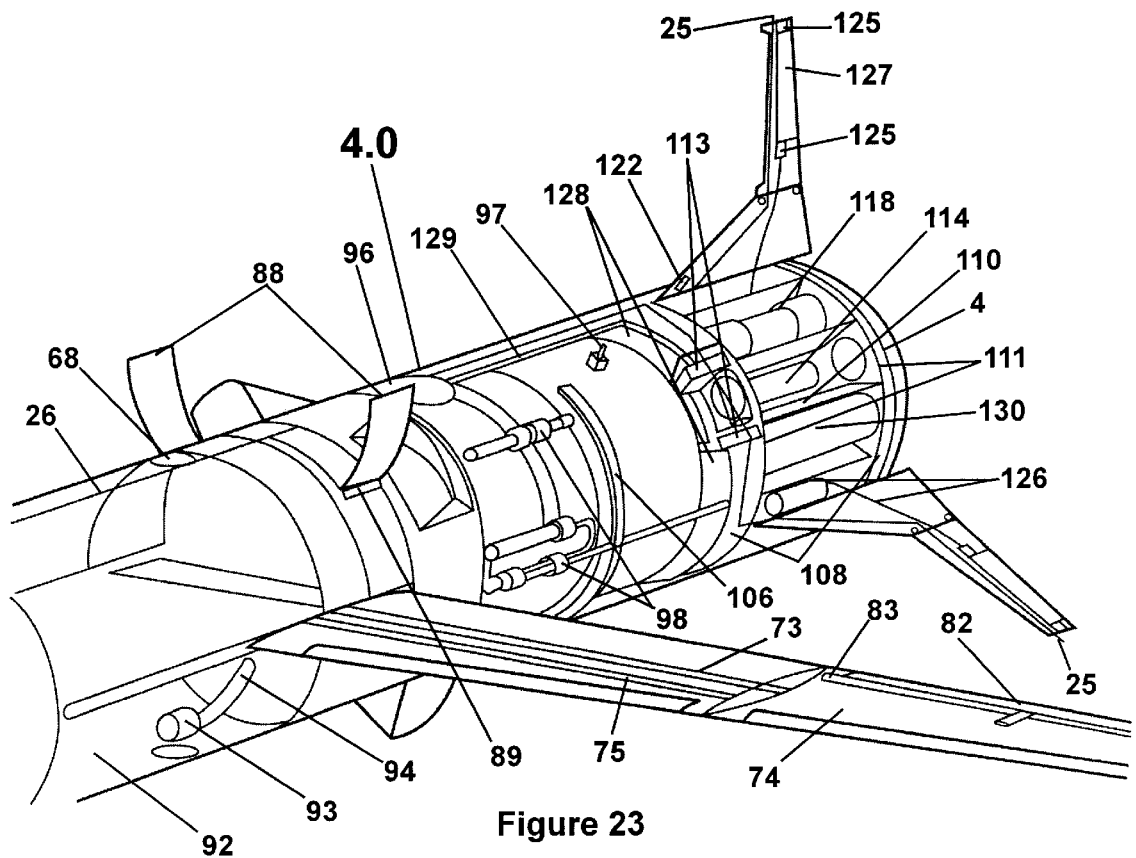
FIG. 23 is a perspective transparent view of a fuel tank and wing section with main wings and recovery parafoil doors.
Figure 24:
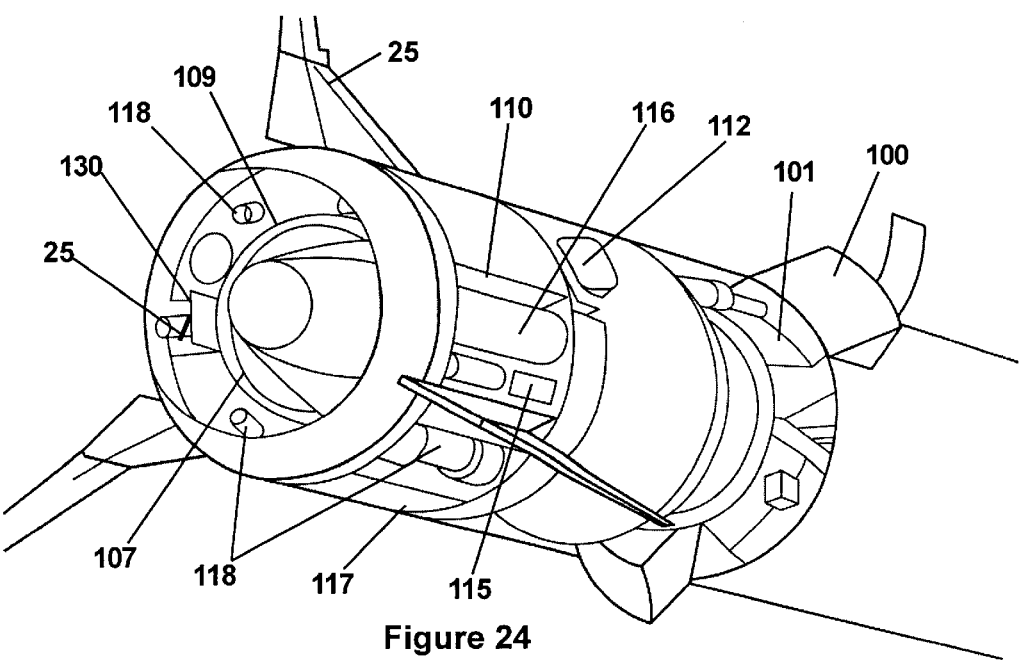
FIG. 24 is a rear perspective transparent view of a powerplant section of a UAV of the present invention.

Satellite signals are preferably received and transmitted by integrated wing surface, flat patch arrayed electronically steered satellite telemetry antenna(s) 24, as shown in FIG. 1. Telemetry antenna(s) 24 are preferably typical of those manufactured by Glaxis USA for INMARSAT to accommodate Digital Broadcast System (DBS) video, data, and audio satellite based transmissions. Signals may also be received by direct line of sight transmission over a trailing or fixed RF antenna(s), of existing design, embedded within, and projecting outward of the fin tip extremities of the axially-arrayed control fin assemblies 121, as shown in FIGS. 21, 23, and 24. Once signals are received, they are then processed by systems computer 15 and appropriate mission responses are distributed throughout the various vehicle systems by data, antenna, and power conduit 26. Power conduit 26 connects by means of suitable connectors 200 as necessary at each airframe joint.

Systems computer 15 and other electronic components are powered by a series of airframe section battery systems (not shown) which are attached with other electronics and computer based hardware by electronics mounting frame 27.

Payload Section 2.0

As shown in FIGS. 1–11, payload section 2.0 is the second forward-most modular unit of the UAV 10.0 of the present invention. Payload section airframe 28 provides an internal surface suitable for mounting various fixed or deployed sensor and payload electronics, and an external surface suitable for mounting components, for example, additional sensing antenna elements.

As shown in detail in FIGS. 8–11, payload section 2.0 comprises a rotary launcher assembly 31 mounted to a rotary launcher mounting bracket 32. In a preferred embodiment, rotary launcher assembly 31 is powered by a dedicated rotary launcher battery pack 30, and is controlled by system computer 15 through a rotary launcher motor and control interface 29, by means of signals through the data, antenna and power conduit 26.

Figure 7:
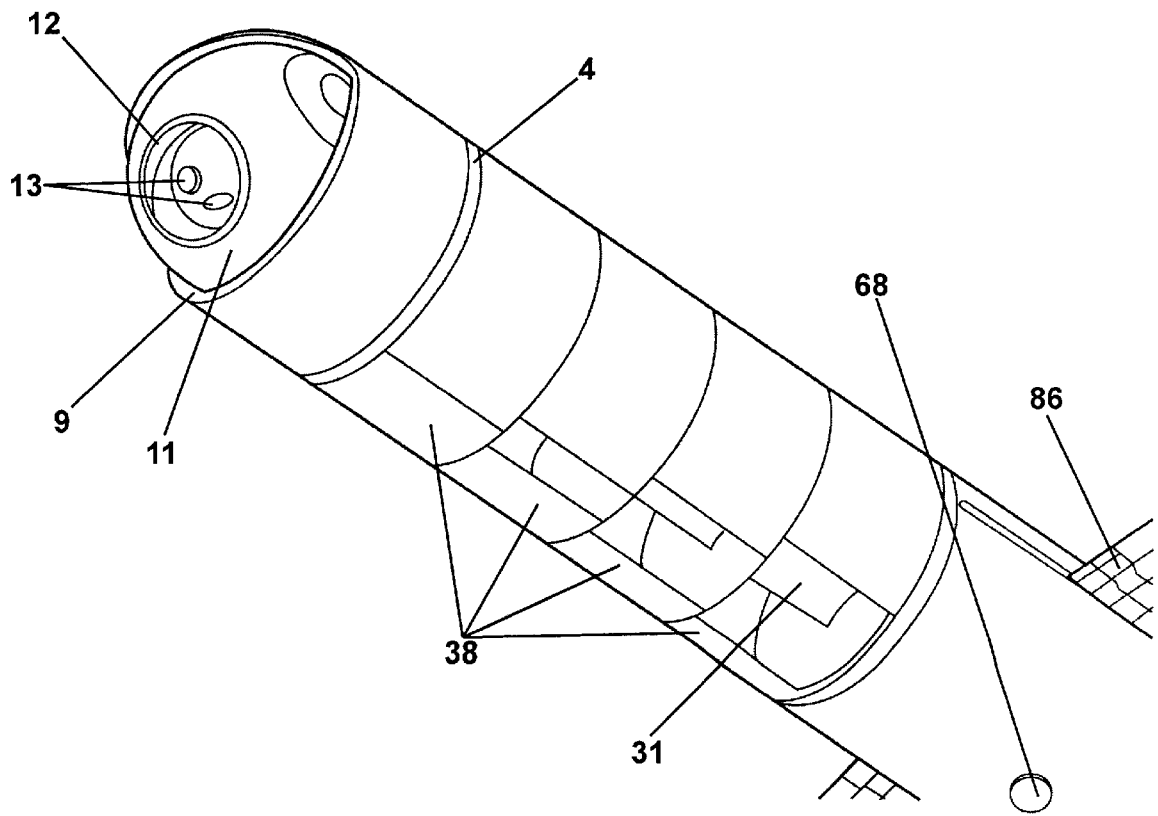
FIG. 7 is a frontal perspective view of a gimbaled sensor nose assembly and payload section of a UAV of the present invention.
Figure 8:
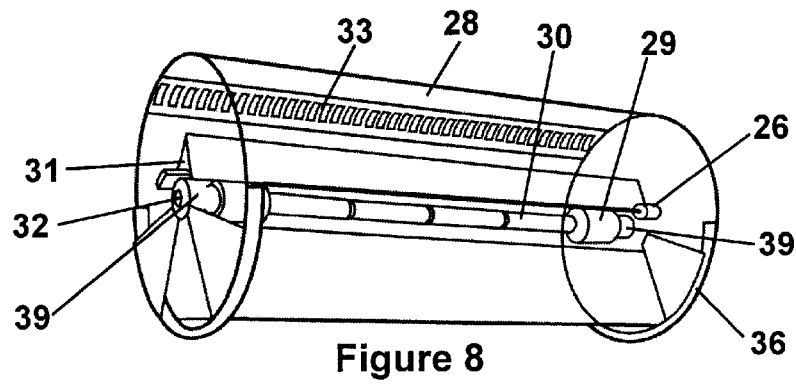
FIG. 8 is a perspective transparent view of a full-size payload section of a UAV of the present invention.
Figure 9:
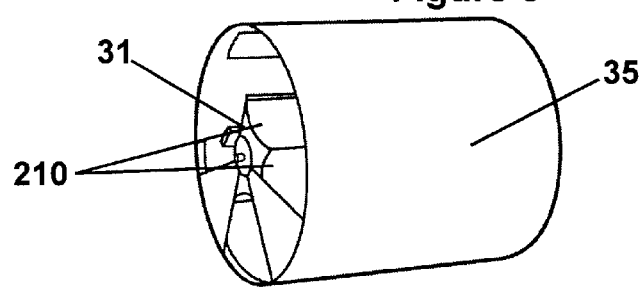
FIG. 9 is a perspective transparent view of a ½-size payload section of a UAV of the present invention.
Figure 10:
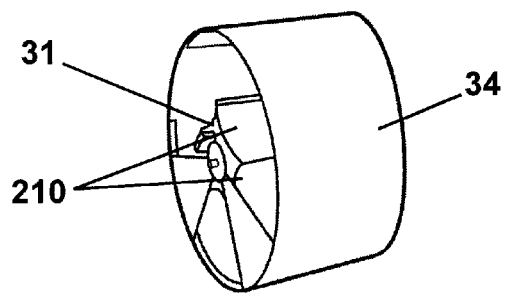
FIG. 10 is a perspective transparent view of a ¼-size payload section of a UAV of the present invention.

Rotary launcher assembly 31 is designed to hold a plurality of payload packages 37 in separate compartments 210. Rotary launcher is similar to existing designs, but unlike existing designs is miniature in size, being small enough to be fitted into the limited space dictated by a sonotube compatible airframe. In a preferred embodiment, payload packages 37 are configured as generally cylindrical canisters. As a particular payload package is desired to be deployed, rotary launcher assembly 31 rotates the desired payload package into deployment position. Preferably a payload scanner 33 selects and verifies payload packages prior to being positioned for deployment, for example, by existing bar-code type reader technology. Once selected for deployment, payload packages 37 are released through either one or all of the payload release doors 38, as shown in FIG. 7, which are opened or closed by a pair of payload release door actuators 39.

Figure 11:
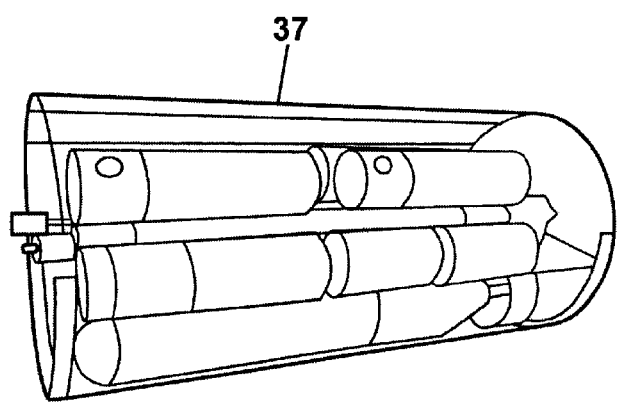
FIG. 11 is a perspective transparent view of a loaded full-size payload section of a UAV of the present invention having various payloads in place.

As shown in FIGS. 8–11, payload section 2.0 may be sized appropriately to the desired payload. In particular, payload section 2.0 may be full sized 36, shown in FIG. 8, half sized 35, shown in FIG. 9, or quarter sized 34, shown in FIG. 10. Typically, full sized payload sections may be 15 to 20 inches long, with fractional sizes as small as 3 to 5 inches long. Additionally, in a preferred embodiment, multiple sections, for example four quarter sized sections 34, may be used together to form a larger section with separately operating release doors 38 and other system components. Other variations are possible, for example, "stretch" versions of the above-named variations may be implemented, and the disclosed types are not to be understood as limiting in scope. Used in this manner, each section may contain and launch a mix of separate payload packages 37, or all the separate sections may operate in concert to handle a single payload package 37 in all or some of the compartments 210. FIG. 11 shows a payload section comprising "stretch" full-size payload section, with various size payloads. For example, in one compartment is shown a full size payload package 220 with a half size payload package 230, and two quarter-size payload packages 240.

Figure 12:
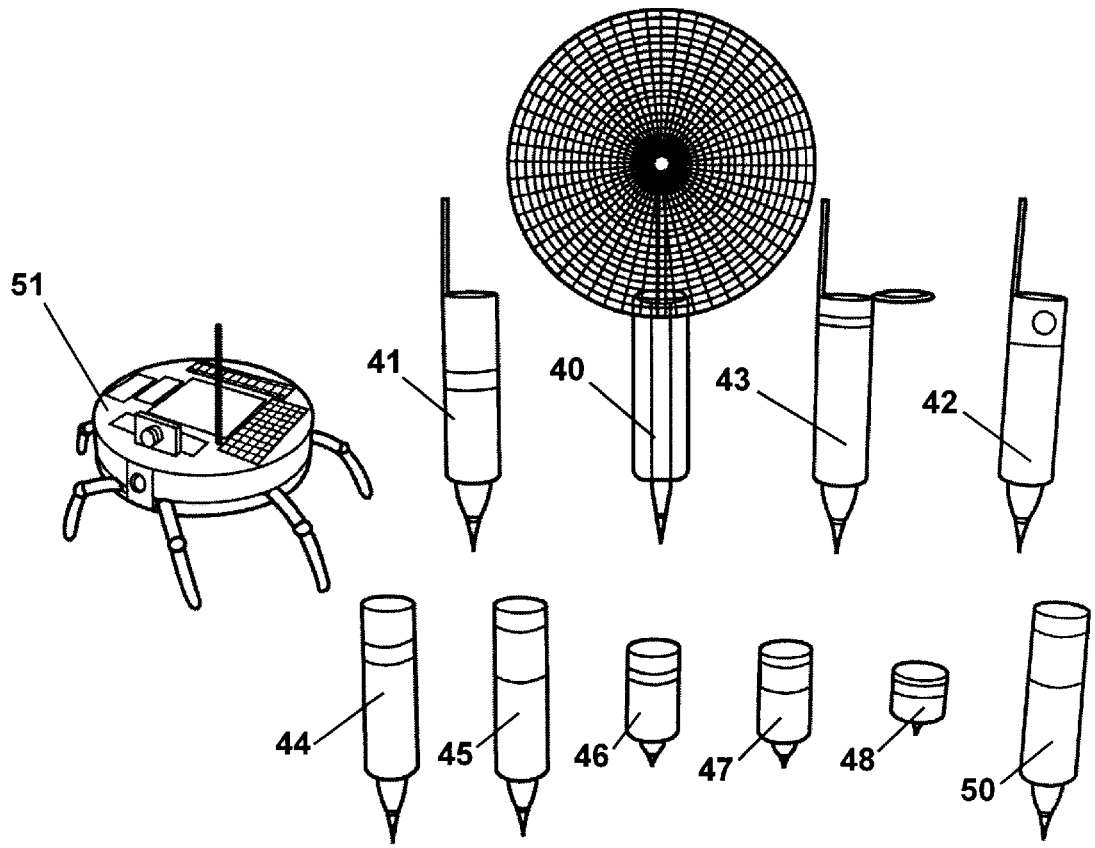
FIG. 12 is a side view of various rotary or vertical tube launcher compatible terrestrial payloads and sensors for a UAV of the present invention.

In a preferred embodiment of the present invention, several types of deployed sensors of existing design could be integrated with several different existing commercial off the shelf products to create a suite of deployed sensing or payload products. Among the deployed sensors adaptable for payload packages 37 are several miniature variations of existing (but larger) products typical of dropsondes, built by Tracor Inc. Austin, Tex., USA, and used by General Atomics Ltd. for the Predator UAV. Other sensors suitable for miniaturization include those developed under the Unattended Ground Sensors (UGS), and Intranetted Unattended Ground Sensors (IUGS) DARPA programs undertaken in conjunction with Sandia National Laboratories, as shown in FIG. 12. These sensors include, but not limited to, terrestrial type payloads of acoustic sensors 40, seismic sensors 41, ALLTV video sensors 42, multispectral gas detection sensors 43, communications relay transceivers 44, smoke markers 45, strobe markers 46, gas markers 47, illumination flares 48, marker flares 49, or GPS markers 50.

Figure 14:
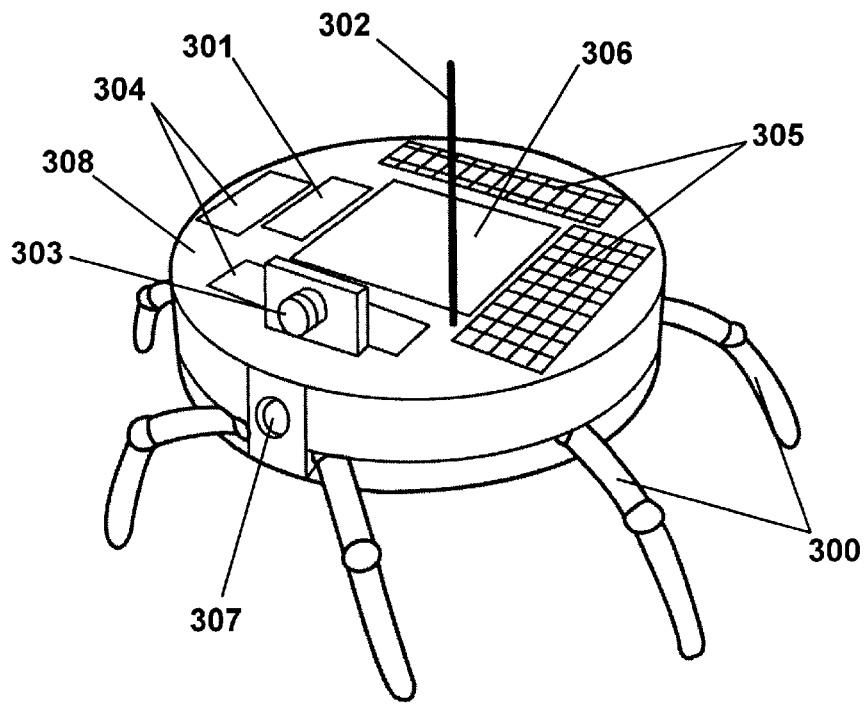
FIG. 14 is a perspective view of a spider robot suitable for deployment from a UAV of the present invention.
Figure 15:
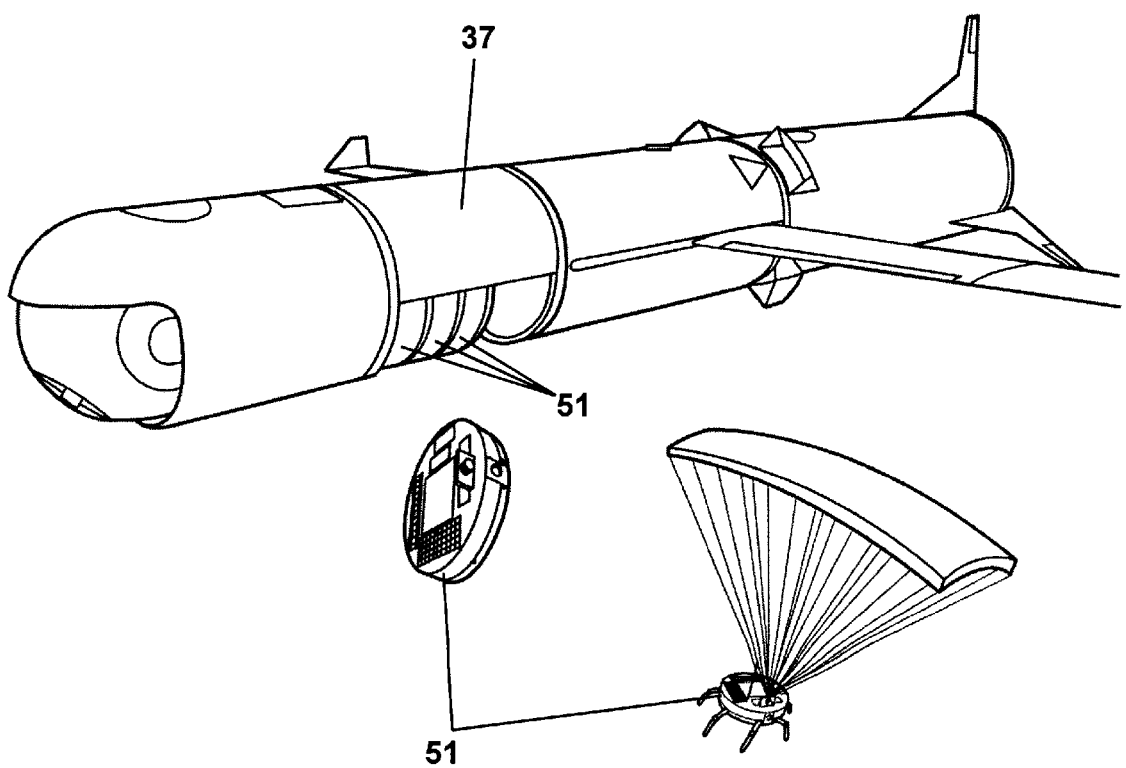
FIG. 15 is a perspective view of a spider robot being deployed from a UAV of the present invention.

Additionally, semi- or fully-autonomous equipment may be deployed, such as mobile terrestrial spider robots 51 typical of those manufactured by Lynx Motion USA or other spider robots of existing design, for example, those engineered by the Massachusetts Institute of Technology Artificial Intelligence Lab. It is also contemplated that several types of air-deployed marine-based sensors could be manufactured by making suitable modifications to the representative terrestrial sensors disclosed. As depicted in FIGS. 14, and 15, spider robot 51 may be specifically adapted for sonotube deployable configurations. In such configurations spider robot 51 is equipped with a sectional circular casing 308 to provide a mounting surface and housing for various internal components. When adapted for UAV deployment, spider robot 51 is approximately 4.75 inches in diameter and has externally mounted retractable leg assemblies 300, GPS positioning antenna 301, RF antenna 302, video sensors 303, audio sensors 304, photovoltaic charging array 305, satellite telemetry antenna 306, and radar sensing chip 307. As shown in FIG. 15, spider robot 51 may be deployed from payload section and descend by parachute as retractable leg assemblies 300 are extended.

Further payload sensors include several variations of air-deployed marine based sensors consisting of terrestrial sensors with modifications to enable floatation and depth profiling typical of larger Type "A" sonotube sensors manufactured by Spartan Electronics of Michigan, and Devtek of Halifax, Nova Scotia. Marinized sensors and payloads may include active or passive sonar sensors 52, surface Lagrangian drifter sensors 53 for measuring surface temperature, gas, emission, ultraviolet radiation, wind velocity, wind direction, wave height, or other data. Profiling sub-surface sensors 54 measure temperature, depth, conductivity, salinity, turbidity, velocity, or other environmental parameters within a given column of water. Marinized sensors may be mounted on a full length micro autonomous underwater vehicle 55, of existing design, typical of those produced by International Submarine Engineering Ltd. Such sensors may be used for controlled synoptic and temporal sampling of a specific column of water, or to undertake a video investigation of the littoral subsurface environment.

Figure 13:
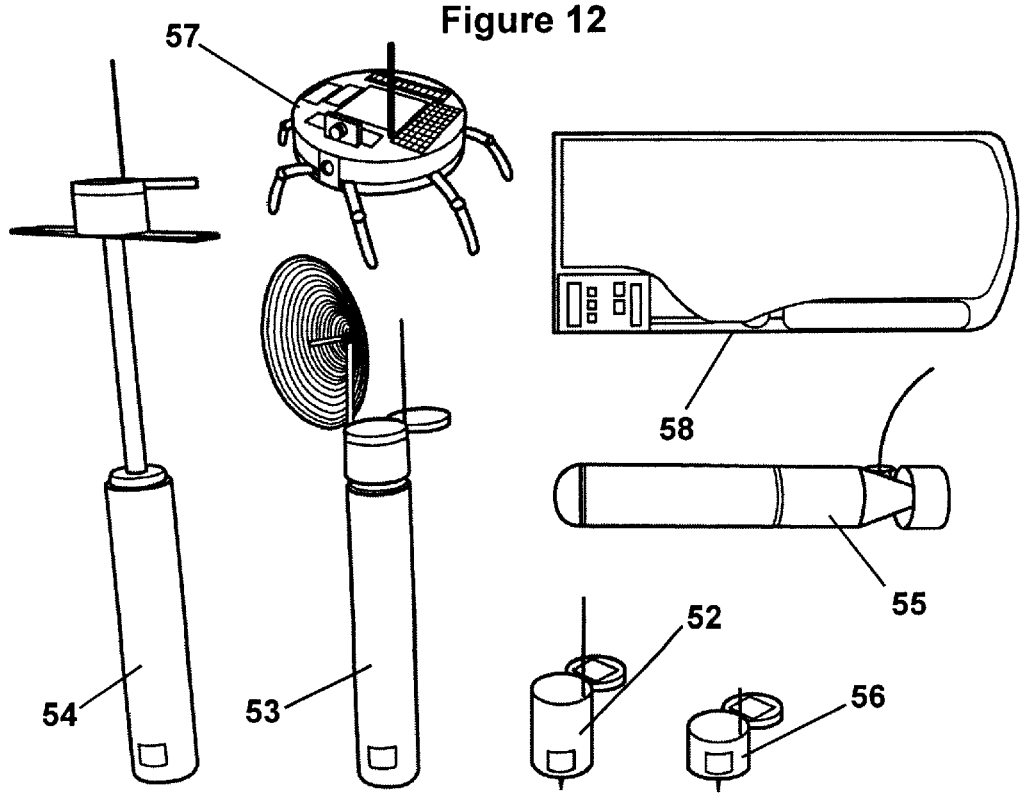
FIG. 13 is a side view of various rotary or vertical tube launcher compatible marine payloads and sensors for a UAV of the present invention.

Further marinized sensors and payloads are shown in FIG. 13, including various GPS correlated Self Locating Datum Marker Buoys (SLDMB) 56, for search and rescue applications similar to those in use by the Canadian Department of Defense. Marinized spider robots 57 similar to those described for terrestrial applications but adapted for littoral sensing and detection efforts typical of shoreline Mine Counter Measures (MCM) may be used as well. If required, a single person liferaft assembly 58 typical of those manufactured by McDonnell Douglas for the U.S. Navy on the Escapac 1-E Zero Zero ejection seats, may be adapted for deployment. Alternatively, a single person liferaft from Sevylor Ltd., CA, USA may be utilized.

Figure 16:
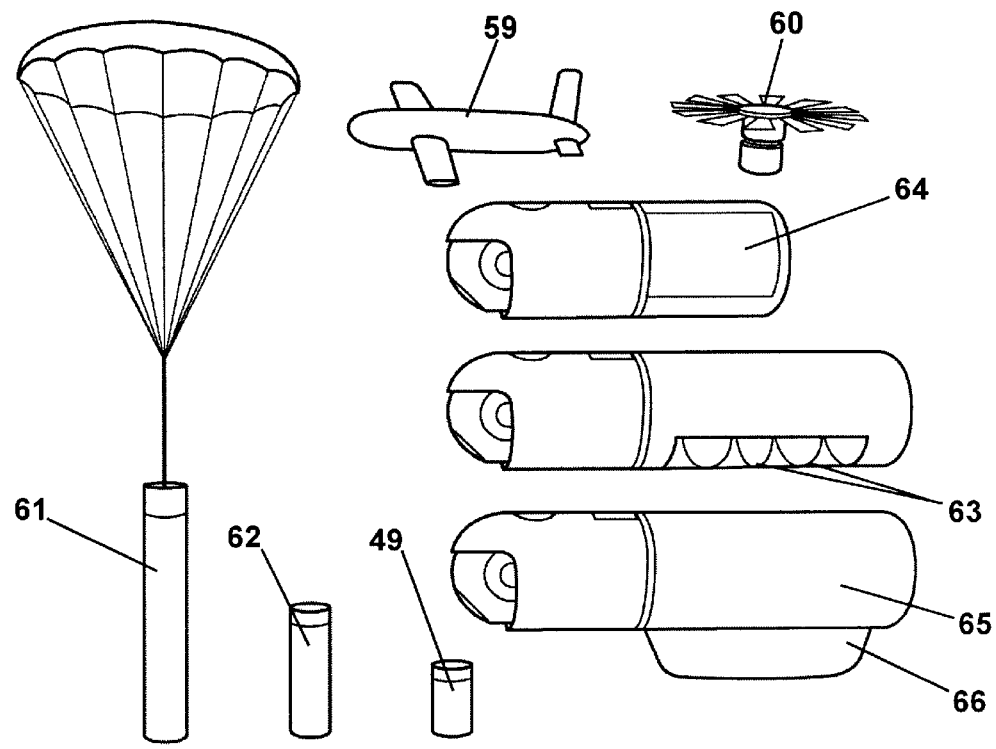
FIG. 16 is a side view of various rotary launcher compatible aeronautical deployed packages for UAV of the present invention.

As an alternative to deployed payloads, or in conjunction with deployed payloads, a preferred embodiment of the current invention also includes sensor and work package payloads within the payload section 2.0. Such sensors include, but are not limited to, various atmospheric sampling sensors, biochemical detection sensors, gas chromatographic sensors, and related equipment. Work package payloads include, but are not limited to, LIDAR laser scanners, magnetic anomaly detection, electronic TALD/ITALD/MALD missile countermeasures, electronics communications jamming equipment, communications relay equipment, or photogrammetric camera(s) 63, as shown in FIG. 16. Also shown in FIG. 16, are two configurations of airborne radar, side looking airborne radar 64, and bottom mounted airborne radar 65, both using micro radar chips developed by the U.S. Lawrence Livermore National Laboratories. In the preferred embodiment the UAV 10.0 may also incorporate LADAR scanning sensors typical of those developed by the U.S. Air Force Wright Laboratories under the Low Cost Autonomous Attack System (LOCAAS) air deployed micro munitions program. In a preferred embodiment, bottom mounted airborne radar 65 further employs a spring loaded retractable antenna 66, which enables the ballistic launch of the UAV without special antenna modifications.

Wing and Fuel Tank Section 3.0

As shown in FIG. 1, wing and fuel tank section 3.0 attaches to payload section 2.0. Wing and tank section 3.0 comprises a wing and fuel tank airframe casing 67, as shown in FIG. 1, airframe casing 67 providing an internal mounting surface for various deployable wing configurations, an internal cavity for storing fuel, and an external mounting surface for various other components, such as navigation strobe lights 68, and at least one refueling orifice 69.

Figure 17:
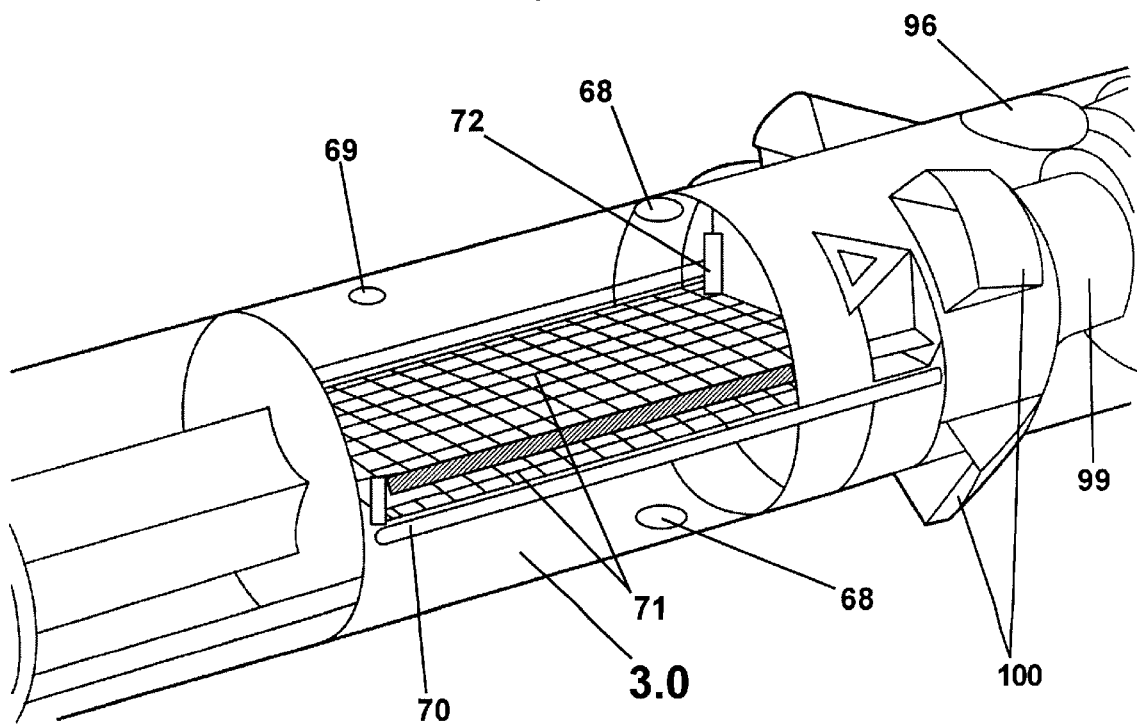
FIG. 17 is a perspective transparent view of fuel tank and wing section with main wings retracted in a UAV of the present invention.

Wing and fuel tank section 3.0 is preferably attached to other airframe sections by means of the lock sealing ring arrangement as disclosed for nose section 1.0. Wing and fuel tank section 3.0 receives and relays power and data by the data, antenna and power conduit 26, as shown in FIG. 17. Data is transmitted with and from systems computer 15, which signals a wing deployment lock actuator 70, shown in FIG. 17, which releases for deployment at least one inboard wing 71 as shown in FIGS. 17–22.

In a preferred embodiment inboard wing 71 pivots into position about a spring-loaded pivot pin 72, which is mounted perpendicular to the longitudinal axis of the vehicle and oriented vertically to the normal flight attitude of the vehicle. As inboard wing 72 pivots into position outboard wing deployment springs 73 are triggered, effecting ejection of outboard wing 74, as shown in FIGS. 18–22. In a preferred embodiment outboard wing 74 is aided in ejection with the use of outboard wing deployment guides 75, shown in FIG. 22A. In a most preferred embodiment, Whitcomb-type winglets 76 are simultaneously deployed with outboard wing 74, being activated by winglet spring loaded hinges.

Figure 18:
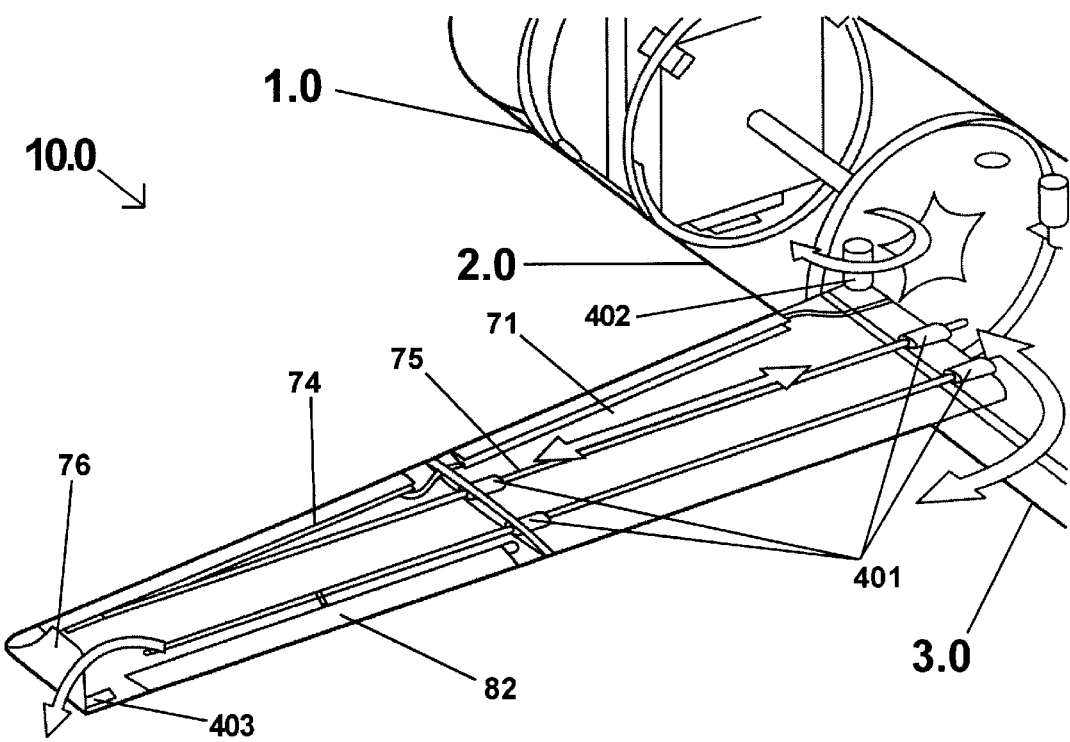
FIG. 18 is a perspective transparent view of fuel tank and wing section showing main wing extension mechanisms.
Figure 19:
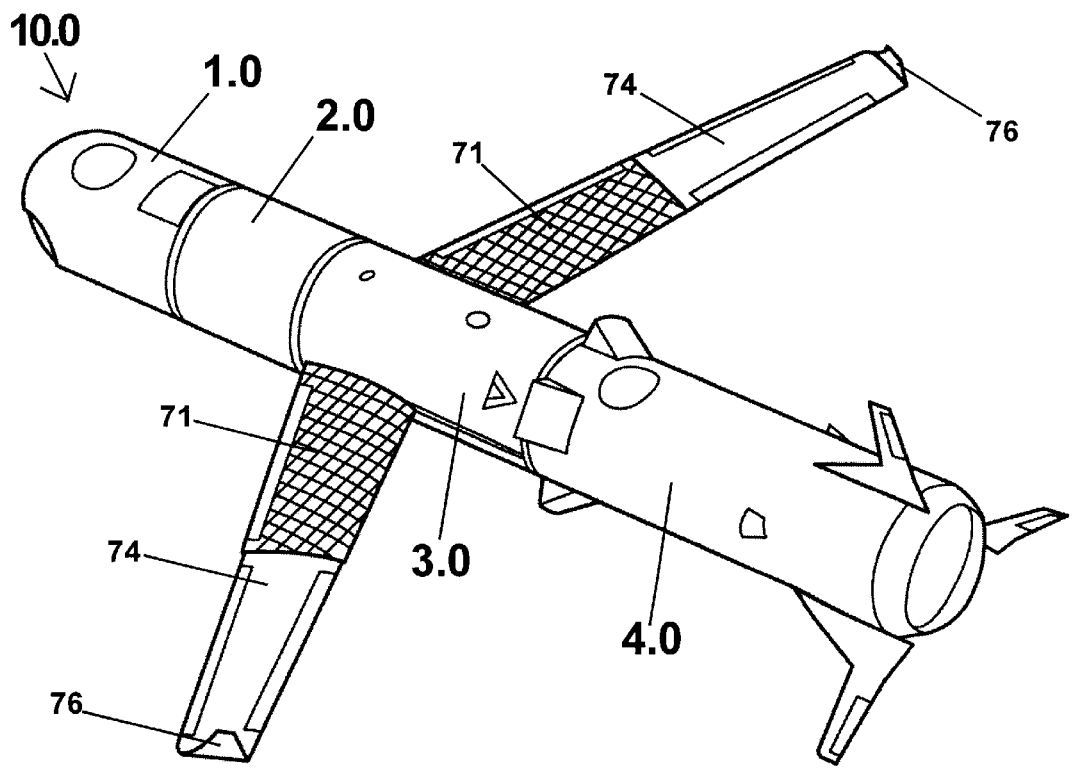
FIG. 19 is a rear perspective view of a UAV of the present invention with wings in a partially swept back position.
Figure 20A:
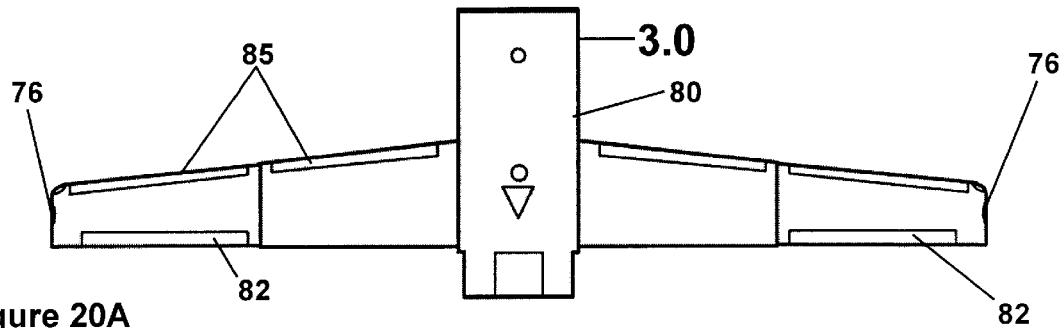
FIGS. 20A–20D are plan views of four replaceable wing configurations of a UAV of the present invention.
Figure 20B:
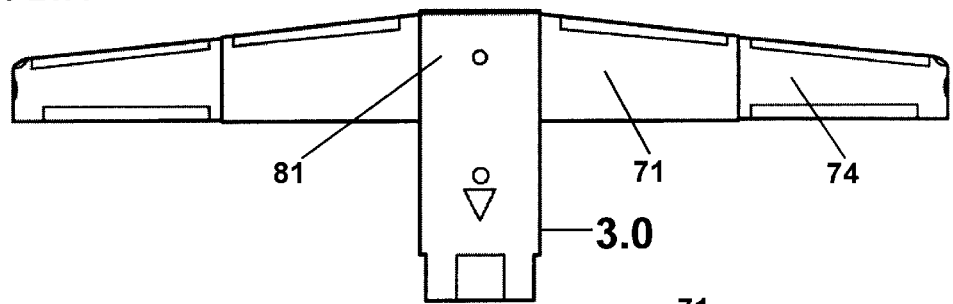
Figure 20C:
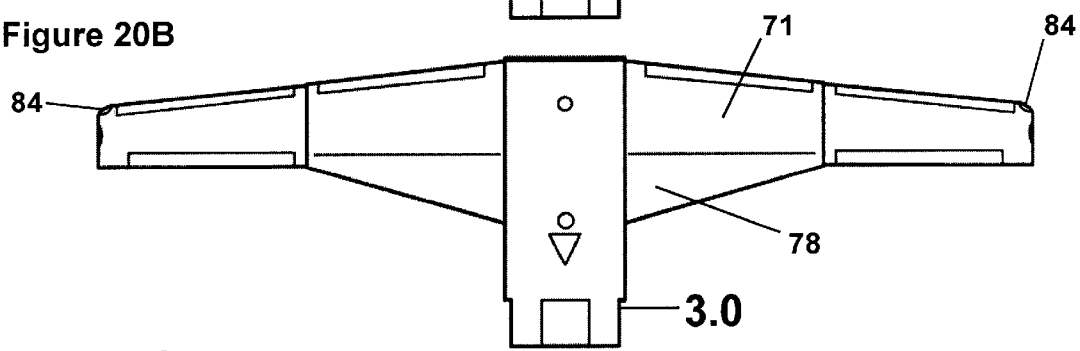
Figure 20D:
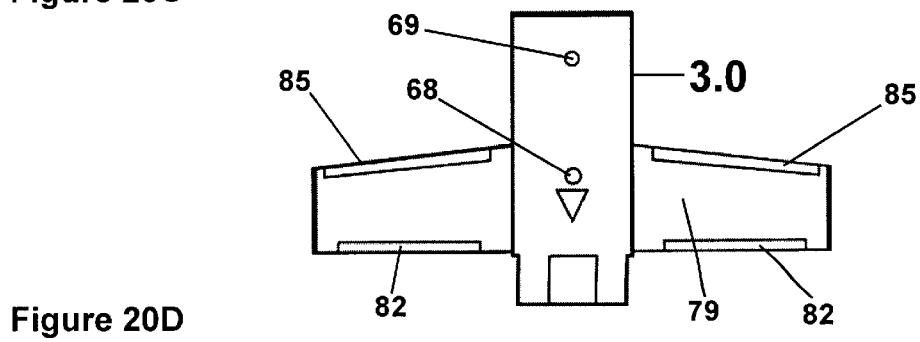

As shown in FIGS. 18 and 19, in an alternative embodiment of UAV 10.0 spring loaded pivot pin 72, and outboard wing deployment springs 73 may be replaced by a hydraulically- or electrically-driven servo deployment system which is capable of extending the inboard or outboard wing configurations incrementally while in flight. This method of extension and retraction achieves dynamic, mission-specified wing deployment to accommodate varying wing span and variable wing geometry or sweep. This operator definable method of deployment is achieved by a wing span extension screw actuator assembly 401, a wing sweep actuator assembly 402, and a winglet hinge actuator assembly 404. Otherwise, this design uses substantially the same structural and mechanical elements described above in the spring-actuated version of wing deployment.

As shown in FIGS. 20 and 21, the modular design of UAV 10.0, and more particularly, the modular design of wing and fuel tank section 3.0, accommodates differing load and balance requirements of variable fuselage, or overall airframe, lengths. The overall airframe length of the UAV 10.0 may be varied for various system requirements, such as higher speed, higher altitudes, or larger payloads. For example, for UAV's adapted fro launch from Type "A" sonotubes the overall length is typically about 36 inches. For launch from a "stretch" Type "A" sonotube the overall length of the UAV is typically about 47 inches. For launch from Type "B" or "C" sonotubes, the UAV length is typically about 59 inches. For all the various lengths of the UAV, the diameter remains about 5 inches, and as such is sized for all sonotubes. All dimensions are typical of a micro-miniature UAV 10.0, but are not to be strictly limiting; the modularity of all the sections provides for a wide range of actual vehicle lengths.

Figure 22C:
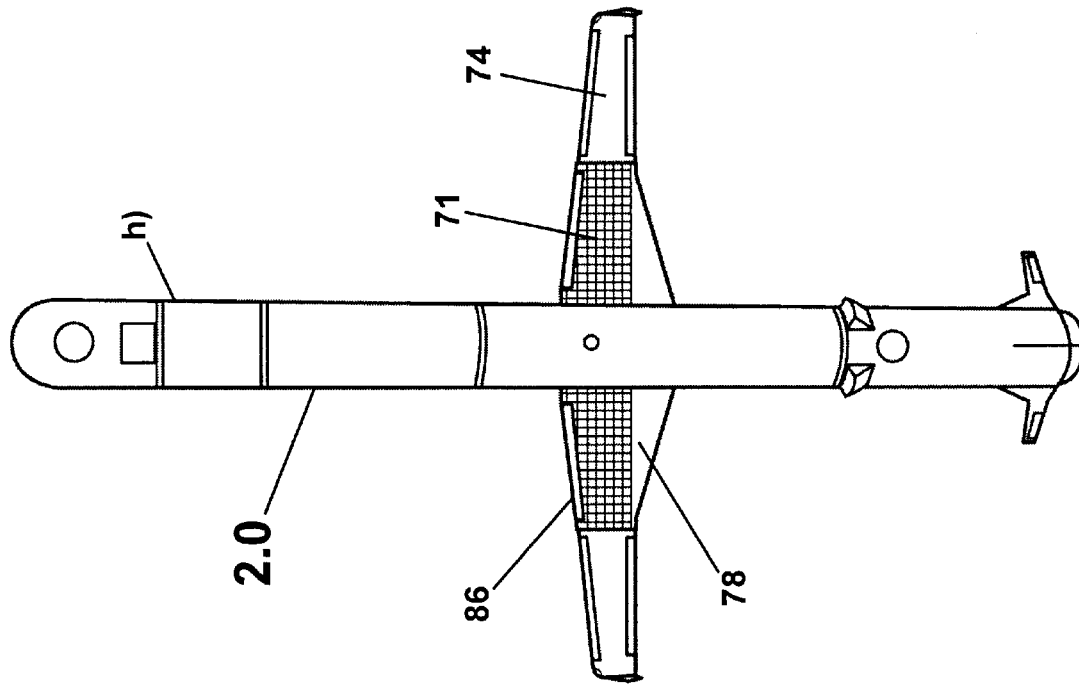
FIGS. 22A–C are plan views of three embodiments of UAVs of the present invention showing differing lengths of various sections, and differing wing placements.
Figure 22B:
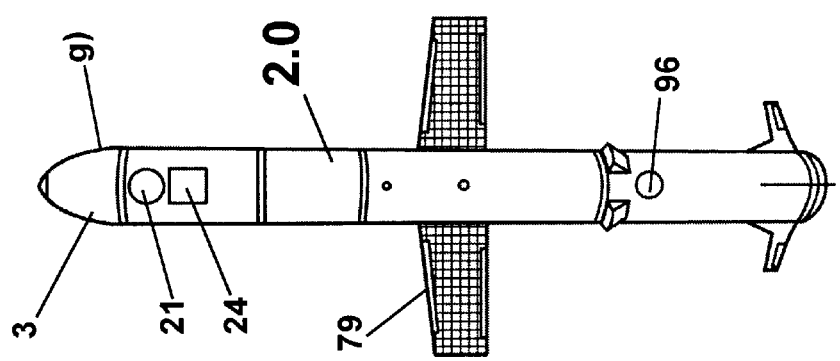
Figure 22A:
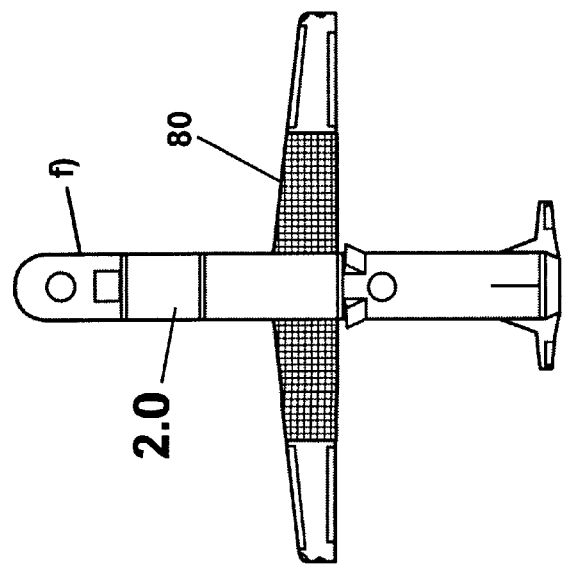

Payload section 2.0 may be short, FIG. 22A, long, FIG. 22C, or multiple payload sections may be placed in series, such as shown in FIGS. 22B and C. In addition, wing design and placement can be modified for various desirable flight characteristics. For example, for slower flight characteristics trailing edge wing web inserts 78, as shown in FIG. 22C, may be employed. For high speed applications, shorter high speed wings, 79, as shown in FIG. 22B, may be employed. Wing and fuel tank section may accommodate rear deployed wings 80, or forward deployed wings 81, as shown in FIGS. 20A–20D. Additionally, the wings may employ various other useful components including, but not limited to, ailerons 82, navigation lights 84, wing deicing boots 85, and wing mounted flat patch array antenna(s) 86.

Fuel for the UAV 10.0 flight propulsion system is housed in wing and fuel tank section 3.0, being contained in a primary fuel tank bladder 92, as shown in FIG. 23. Fuel is injected through a fuel line 94 by of a shutoff valve 93.

Wing and fuel tank section 3.0, may house other components which may be employed as needed. For example, an internally-housed recovery parachute may be deployed through recovery parachute door(s) 88, actuated by parachute door lock actuator(s) 89. Additionally, a recovery impact bag 90, described below with reference to FIG. 43, may be deployed through recovery impact bag door(s) 91, opened by recovery impact bag compressed air cartridge and door lock actuator 120 to effect a soft impact upon landing of the UAV.

Powerplant Section 4.0

The rearmost section of the UAV is powerplant section 4.0, as shown in FIG. 1 and FIGS. 22A–26. Powerplant section 4.0 comprises a powerplant airframe casing 95, as shown in FIG. 1, which provides an internal mounting surface and cavity for mounting or otherwise housing the powerplant and various accessory systems. Powerplant section 4.0 is preferably attached to other airframe sections by means of the lock sealing ring arrangement as disclosed for nose section 1.0. As shown in FIG. 23, powerplant section 4.0 receives and relays power and data by the data, antenna and power conduit 26, being connected to adjacent sections by suitable connector means. Signals from systems computer 15 to a fuel control and injector assembly 98 regulate fuel flow to the powerplant assembly, as discussed below. Additionally, as shown in FIG. 23, powerplant section 4.0 preferably includes an aft GPS antenna 96, and an orifice for a launch spark initiator 97.

Figure 25:
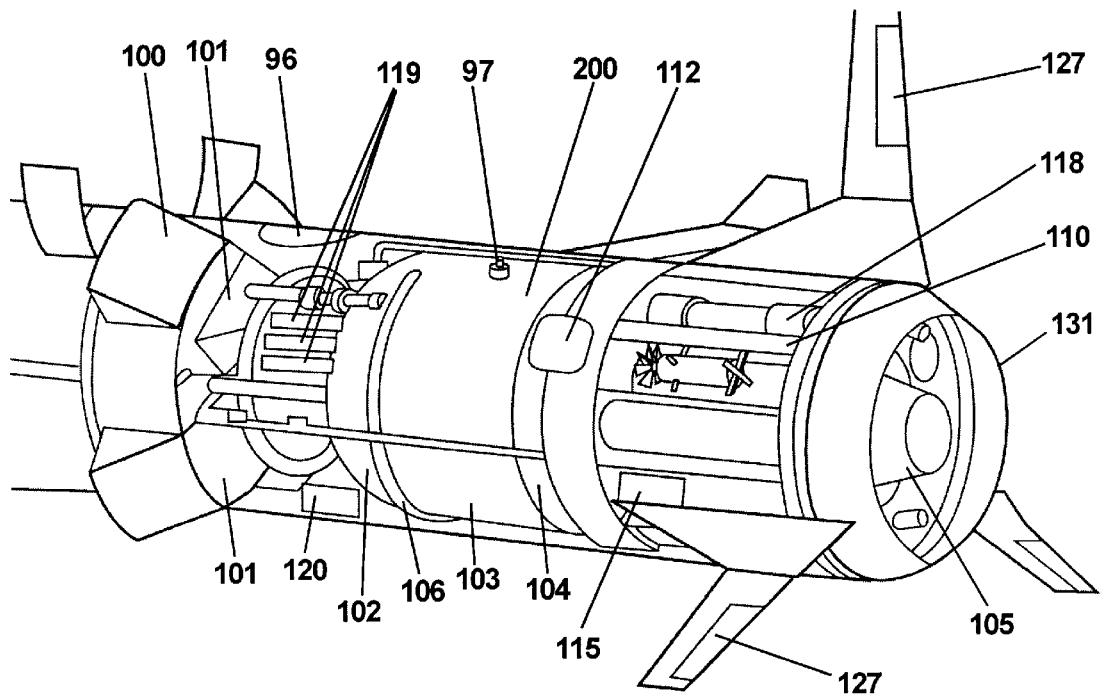
FIG. 25 is an additional rear perspective transparent view of a powerplant section of a UAV of the present invention.

The preferred powerplant for inflight cruising is a turbojet engine 200, as shown in FIG. 25, preferably of existing design typical of the Sophia J-450 series micro turbojet manufactured by Mecoa USA. Alternatively, the more powerful TJ-50 turbojet engine manufactured by Sundstrand Aerospace of San Diego, Calif., USA could be used for heavier and longer UAVs that require greater thrust. Outside air for the turbojet engine enters by way of recessed air intake nacelle assemblies 100, shown, for example, in FIGS. 1 and 25. Air from intake nacelle assemblies 100 is ducted into intake duct assemblies 101, and directed into a compressor air intake assembly 99, shown in FIG. 17, and further into a first stage engine centrifugal compressor 102. With reference to FIG. 25, air is then heated in a combustion chamber 103 and distributed through a rear diffuser and turbine fan assembly 104, and then expelled through a tailpipe 105. Powerplant equipment is preferably mounted to airframe section 95 by engine mounting assembly 106, as shown in FIG. 25.

In a preferred embodiment, as shown in FIGS. 23–25, powerplant section 4.0 houses various auxiliary systems arrayed around tailpipe 105. These auxiliary systems are protected from exhaust heat emitted through tailpipe 105 by a cylindrical heat shield 107, preferably of composite ceramic design. Heat shield 107 is preferably manufactured using existing ceramic composite technologies familiar to those skilled in the art, and held in place by a pair of ceramic shield mounting plates 108 connected to a cylindrical shaped ceramic heat shield liner 109.

A shown in FIGS. 23–25, in a preferred embodiment a number of axially arrayed accessory dividers 110 are formed with or mounted to heat shield liner 109, arrayed around ceramic heat shield 107. Axially-arrayed accessory dividers provide mounting areas and surfaces for various accessory items mounted by means of various accessory mounting brackets 111. In particular, in a preferred embodiment, spring actuated ram air intake nacelles 112, shown, for example in FIG. 25, are deployed on ejection from a ballistic sonotube launch canister by a ram air nacelle spring actuator assemblies 113. Air scooped or rammed from the passing air stream in flight mechanically rotates micro turbine propellers to provide ram air micro alternator/generators 114, with mechanical force to create electrical power.

Additional accessories preferably arrayed around ceramic heat shield 107 include, but are not limited to, means for fire extinguishing 115, an engine starting compressed air cylinder 116, a fuel system N2 compressed gas cartridge 117, and a plurality of Rocket Assisted Take Off(RATO) launch rockets 118. RATO launch rockets 118 are preferably of the design comparable to those manufactured by the Universal Propulsion Company of Phoenix, Ariz., USA, or those developed by the U.S. Naval Surface Warfare Center in Indian Head, Md. RATO launch rockets are preferably arrayed quadratically about the longitudinal axis of ceramic heat shield 107. A plurality of secondary vehicle system batteries 119, and a recovery impact bag compressed air cartridge 120 may also be arrayed around ceramic heat shield 107.

Figure 26:
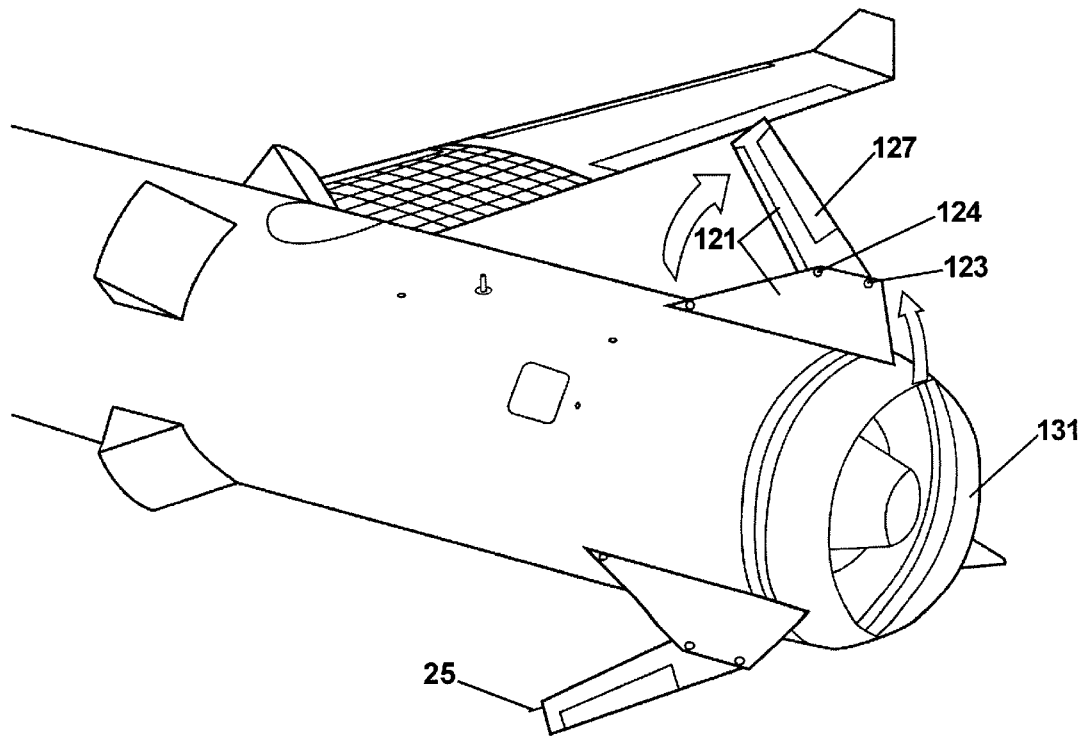
FIG. 26 is a rear perspective view of axially-arrayed control fins in a partially extended position on a UAV of the present invention.

As shown in FIGS. 25 and 26, the accessory space around ceramic heat shield 107 also accommodates a plurality, preferably three, individually mounted and deployed axially-arrayed control fin assemblies 121. Control fin assemblies 121 are deployed into the passing air stream immediately upon leaving the launch canister by a fin extension and retraction actuator 122. Once deployed control fin assemblies 121 are extended into locked positions around control fin hinge assemblies 124, and are held in position by control fin position locking assemblies 123. In a preferred embodiment, each control fin assembly includes control fin elevons 127, as shown in FIGS. 23–26. Control fin elevons 127 are hingedly mounted with elevon mounting socket hardware 125, and are controlled by elevon flight control actuator(s) 126. Control elevons effect composite control over the UAV in flight about the pitch and yaw axes.

In further preferred embodiments, powerplant section 4.0 accommodates an oil reservoir 128 and associated oil lubrication line 129 for providing lubrication through a total loss oil lubrication system to the turbojet engine components. Powerplant 4.0 may also houses a bobbin and RF antenna assembly 130, which may be deployed upon launching. Bobbin and RF antenna assembly 130 is preferably surrounded by an impact shroud 131, shown in FIG. 26, which provides a flexible, semi-rigid, non flammable, composite material to provide a margin of protection for the control fin assemblies 121 in a tail-first landing scenario.

Launch System And Apparatus

Launch Canister Apparatus 5.0

Figure 27:
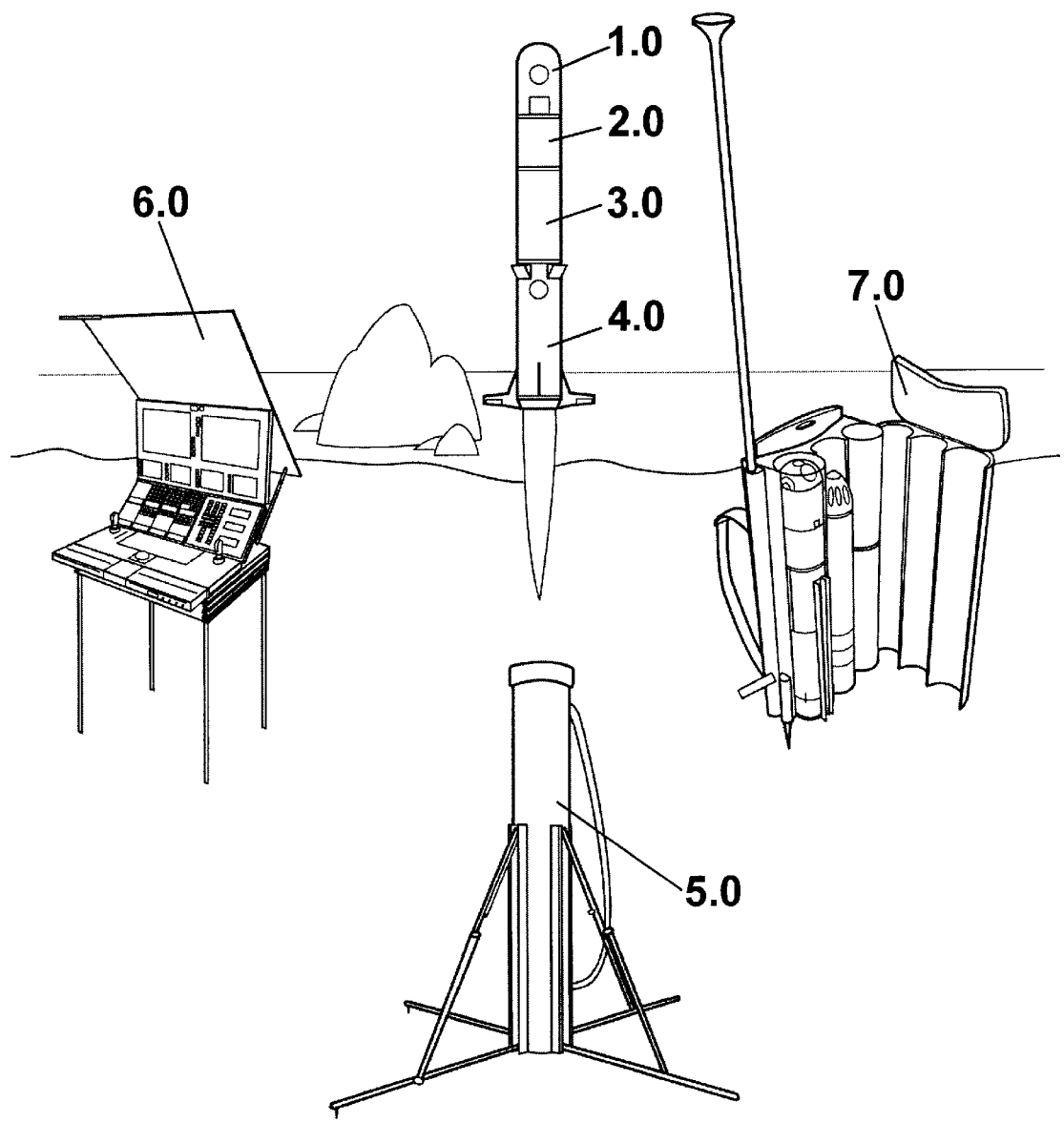
FIG. 27 is a perspective view of a sonotube compatible UAV of the present invention being launched from a man portable carrying canister in conjunction with a C4I control console and a man portable system backpack and deployed antenna assembly.
Figure 28:
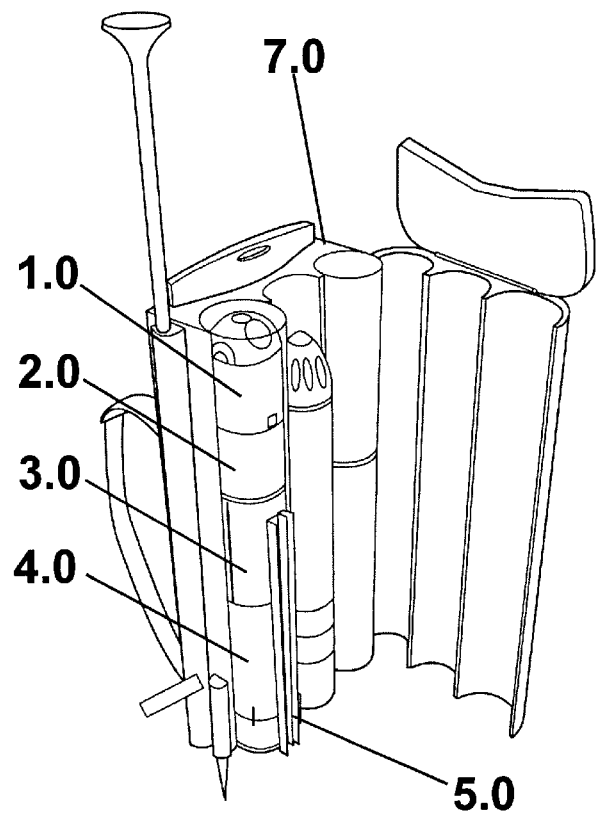
FIG. 28 is a perspective view of a man portable backpack for use with a UAV and system of the present invention.

The launch system and apparatus for the present invention comprises generally a launch canister apparatus 5.0, preferably operating in conjunction with a C4I assembly 6.0, and/or a system backpack apparatus 7.0, as shown in FIGS. 27–30. As shown in FIG. 27, launch canister apparatus is preferably a standard Sonotube canister, generally denoted according to size as type "A", "B", or "C" Sonotubes. Canisters and related launch equipment may be mounted on a man portable back pack 7.0 as shown in FIG. 28. For purposes of reference, a typical size of a micro-miniature UAV 10.0 of the present invention is shown relative to an adult human in FIG. 30.

Figure 30:
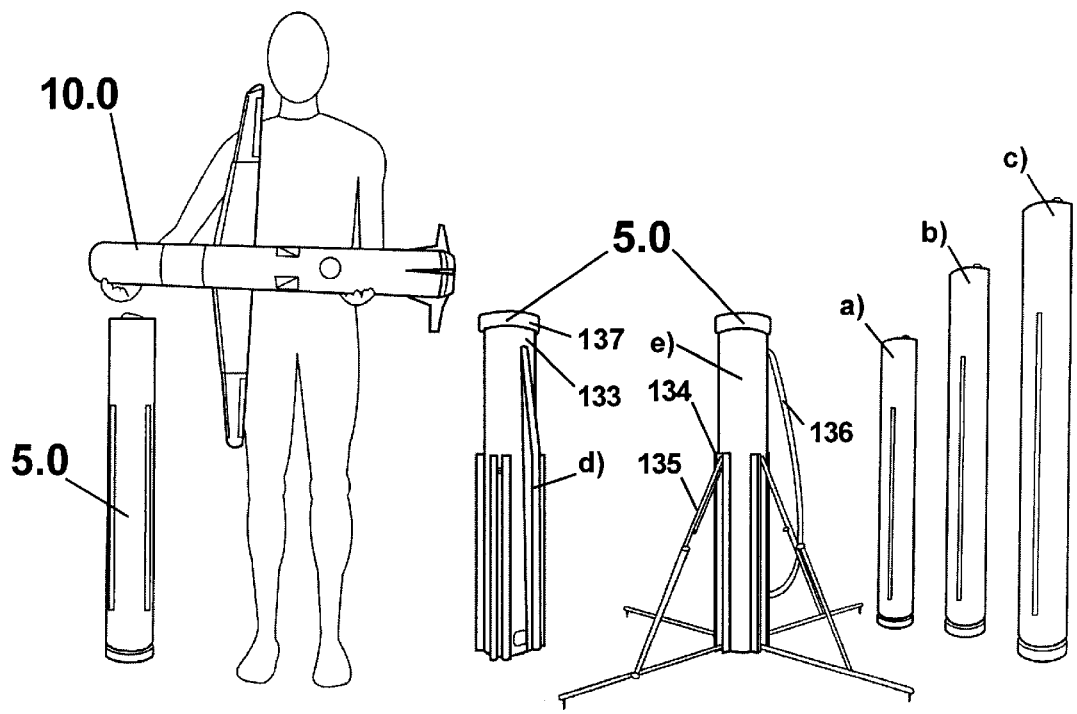
FIG. 30 is a perspective view of variants on sonotube launch canisters and related components, as well as an approximate scale view of a human holding a UAV of the present invention.

As shown in FIG. 30, a preferred embodiment of launch canister apparatus 5.0 is man-portable, comprising a foam-lined, ruggedized cylindrical launch tube assembly 133, an internal ceramic heat resistant liner, and exhaust holds sectioned through the bottom of the liner and external tube assembly 133 to permit the escape of exhaust gases while turbine engine is spooling up for terrestrial launch. This exhaust sequence is unique to the terrestrial launch mode as it is the preferred way to verify the operability of the cruise engine prior to launch. A means of exhaust must be permitted or the vehicle would attempt to launch on the thrust generated by the cruise engine. Launch tube assembly 133 is preferably fabricated from aluminum alloy or other composite material, and includes recessed leg channels 134, to provide a retention and fastening for extendible leg assemblies 135. Extendible leg assemblies 135 extend to provide support and stability prior to and during launching of the UAV of the present invention, as shown in FIG. 27.

Figure 29:
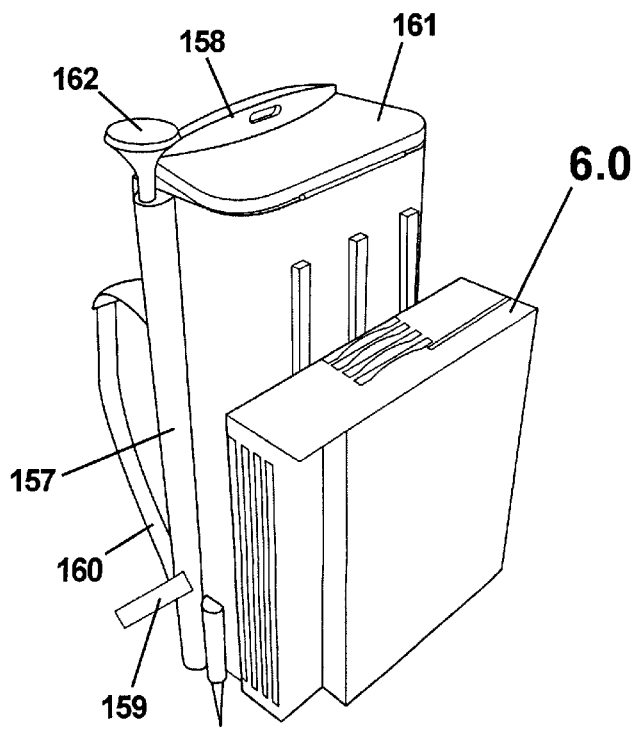
FIG. 29 is an external perspective view of a man portable backpack with a C4I control console in a collapsed and stowed condition.

As shown in FIGS. 28 and 29, launch tube assembly 133 preferably comprises a carrying strap 136, and a combination GPS antenna and launch canister lock cap assembly 137, to provide location support as well as a watertight seal for the launch canister apparatus 5.0.

C4I Assembly 6.0

In a preferred embodiment of the current invention, controlling and tasking of the UAV 10.0 is accomplished with the use of a highly mobile Command, Control, Communications, Computer and Intelligence (C4I) assembly 6.0, as shown in FIGS. 30–33. C4I assembly 6.0 processes raw sensor data, controls the UAV sensors, controls nose section sensors, and otherwise controls communications so as to direct, target, and control payload delivery systems and packages. C4I assembly 6.0 is preferably highly mobile for use in sea, land, and air operations.

Figure 31:
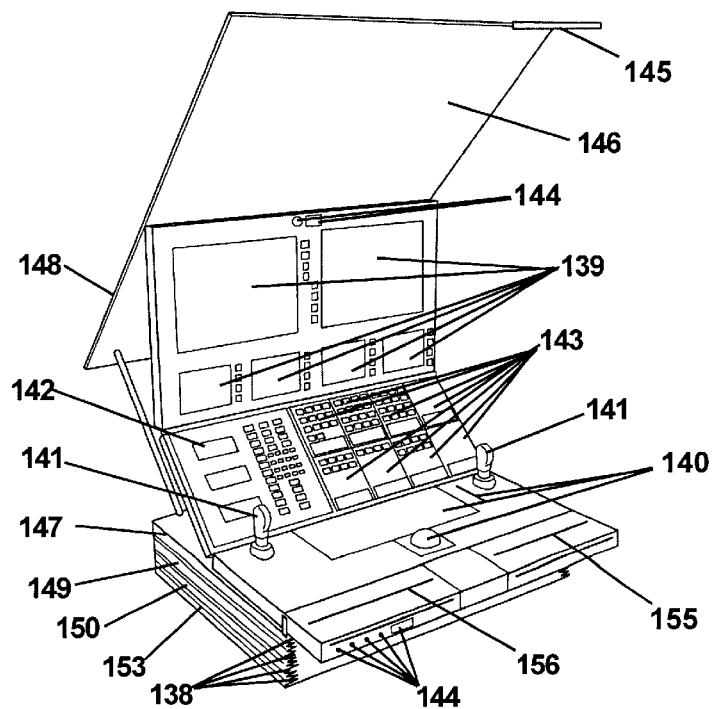
FIG. 31 is a perspective view of a C4I control console in a deployed condition.
Figure 32:
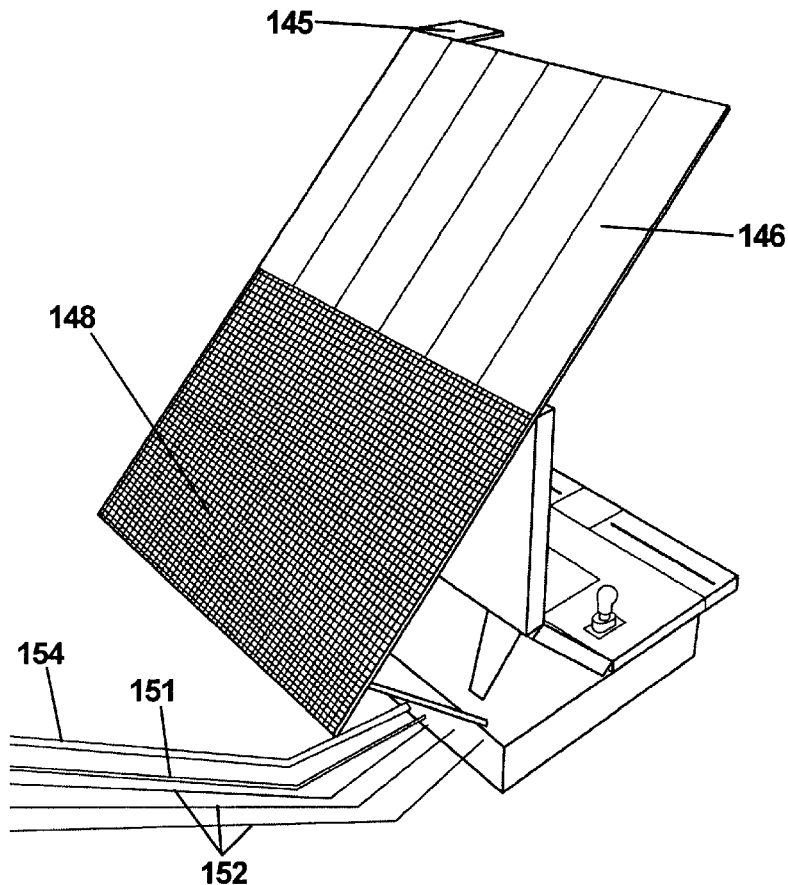
FIG. 32 is a side perspective of a C4I control console in a deployed condition.
Figure 33:
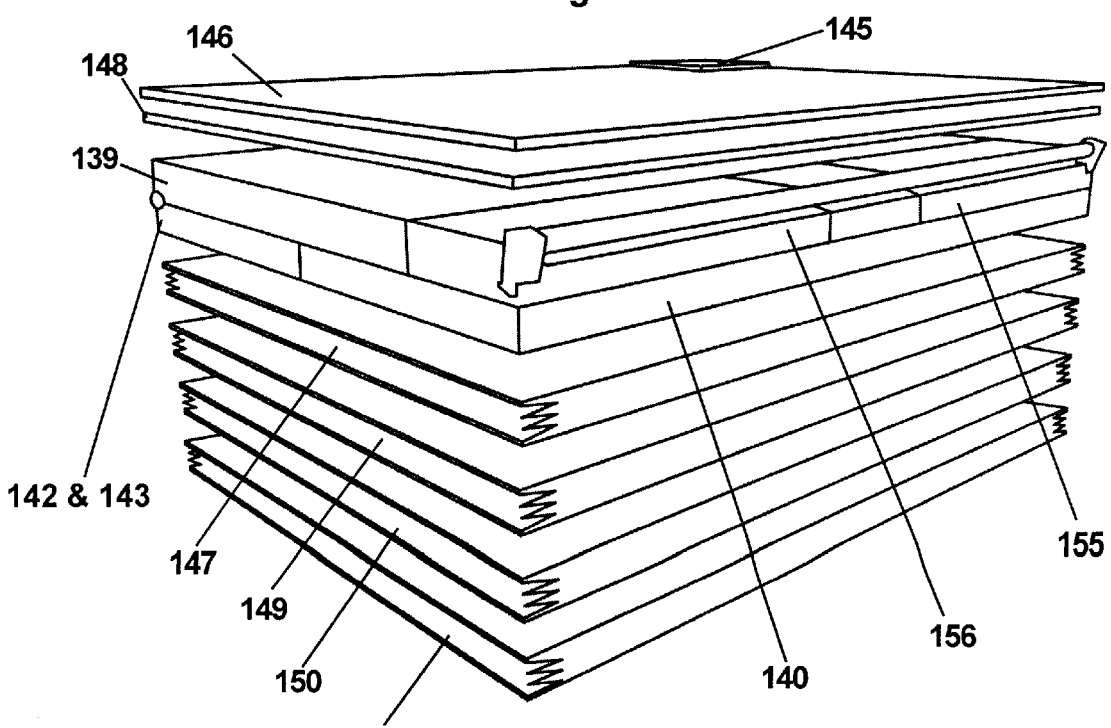
FIG. 33 is a perspective of C4I control console with its respective cases separated to illustrate integration of the console in a collapsed condition.

As shown in FIG. 29, C4I assembly 6.0 is preferably man-portable with other launch system and apparatus components. With reference to FIGS. 31–33, C4I assembly 6.0 comprises a ruggedized, waterproof console casing assembly 138 to provide a waterproof, shock and vibration ruggedized, EMI-shielded housing with conductive cooling means for the internal electronics and display systems. A computer operator display interface 139 is mounted to provide a visual interface, and preferably provides a multiple ruggedized, waterproof, high resolution, active matrix color, stylus interactive, flat panel graphics displays, typical of those manufactured by Sharp Electronics, Japan. Display interface 139 allows an operator to view simultaneous real-time video, data, or other information, such as telemetry transmissions. Information may be transmitted or processed through several different operating systems, including Unix, Windows, Windows NT, DOS, or other hybrid operating systems.

Continuing, with reference to FIG. 31, a control mounting surface is preferably provided to accommodate a preferably ruggedized and waterproof backlit, operator trackball, keyboard, stylus manual interface assembly 140 to physically allow the C4I system operator to interface with the various computer systems. Further, space is preferably allocated for at least one removable operator vehicle manipulator grip 141, to effect control of UAV 10.0 or individual system sensors or components.

In a preferred embodiment, C4I assembly 6.0 further comprises a ruggedized, waterproof, backlit, electronic/computer based operator communications display interface 142 with Liquid Crystal Displays (LCD) of existing design which permit the system operator to establish voice or video communications over up to 8 non-dedicated channels by keying in the appropriate phone number or frequency within the existing telephone network, LF, MF, HF, VHF, UHF, or other SATCOM frequencies. Mounting is provided for operator sensor and vehicle control interface assemblies 143 which provide the system operator and field engineers with a rapidly removed or interchangeable suite of standardized electronic, backlit, hardwired, tactile switches which are slaved to various dedicated control functions required to use unmanned aerial sensors, payload systems, or other system components. Preferably, an operator audio and video interface assembly 144 is provided, comprising a ruggedized, waterproof, headset and/or handset mounted microphone, and speaker connections, with an extendible/retractable color video camera assembly mounted on the flat panel display within console casing assembly 138.

Other components preferably included on C4I assembly 6.0 include optional stand-alone marine and terrestrial based antenna, power and geographic reference system which is independent of external positioning systems described above, comprising console GPS antenna 145, console flat patch satellite communications antenna 146 typical of those manufactured by Magellan, Glaxis, Tecom, or Ball of the USA. Communications antenna 146 transmits and receives video, audio or data telemetry and communications over the INMARSAT, MILSAT, ORBCOM, M-STAR, IRIDIUM, GOES-8, MSAT, or other satellite system. Two or more standard retractable RF whips of existing design may be fastened in a removable manner to the back of the operator flat panel display of console computer case assembly 147. A photovoltaic array solar charging assembly 148 may by sandwiched between the back of the flat panel display section of the console casing assembly 138 and flat patch satellite communications antenna 146.

With continuing reference to FIGS. 31–33, a most preferred embodiment of a system of the present invention includes a suite of hardware which is capable of undertaking the various power conversion, processing, and transmission/reception of the previously described audio, video, and data communications and telemetry functions. In particular, C4I assembly 6.0 comprises a ruggedized, waterproof, VME, 3U or 6U detachable, console computer case assembly 147 equipped with a plurality of Motorola Power PC, or Intel Pentium processors to run various software application programs. Such programs preferably include the Autonomous Vehicle Program developed by International Submarine Engineering Ltd. Processors may be cooled by a series of conductive cooling fins of conventional design attached in the horizontal, to the outside periphery of the console computer case assembly 147.

Further components of a preferred embodiment of the present invention include ruggedized, waterproof, SUN Sparc engine case assembly 149 equipped with two dedicated SUN Sparc processor boards. The processor boards preferably incorporate massively paralleled processing chips using Parallel Algebraic Logic 1 (PAL 1) algorithms, or the pending Parallel Algebraic Logic 2 (PAAL-2) algorithms currently being developed by a team at Lockheed Martin Electronics and Missiles of Florida, USA. To achieve extremely high processing and data transfer rates, it is preferred to use single instruction, multiple data (SIMD) vector based processing architecture developed by the U.S. Air Force Wright laboratory Armament Directorate, particularly in graphic or video intensive processing operations.

A console communications case 150 enables undertaking multi-frequency data, video and audio communications and telemetry incorporating 3U VME transceiver boards spanning a range of frequencies and communication mediums. For example communications and telemetry may go over existing telephone network, LF, MF, HF, VHF, UHF, or other SATCOM frequencies including INMARSAT, MILSAT, ORBCOM, M-STAR, IRIDIUM, GOES-8, or MSAT. The system uses dedicated single frequency 3U VME transceiver boards of existing design or multi-frequency Direct Conversion Receiver (DCM) VHF, UHF, and L-band VME or SEM-E boards comparable to those developed by Rockwell international of Cedar Rapids, IA, USA for the Joint Strike Fighter (JSF) program and Lockheed-Martin Aeronautical Systems, U.S. Air Force F-16 and F-22 Fighter programs. Similar programs suitable for use in the present invention include multi-band, multi-mode, transceivers developed by the U.S. Air Force Rome laboratory, in Rome, N.Y., USA. The system may also use a Harris Corporation of Rochester, N.Y., USA, Manpack-type multi-band radio, which woks with the ITT/General Dynamics Single Channel Ground and Airborne Radio System (SINCGARS) over VHF-FM, VHF AM/FM, and UHF AM/FM frequencies including satellite links with jam resistant and encrypted functions.

Data from console communications case 150, SUN Sparc controller and related equipment is alternatively routed through a data relay cable 151, shown in FIG. 32. Data relay cable 151 allows direct hardwire interface to aircraft, ship, submarine, or ground based vehicle systems. Equipment is connected to various antennas through console antenna cable assemblies 152. A console uninterruptible power supply case 153 is preferably equipped with a 220/120 bolt AC to DC converter with an array of nickel methyl batteries which receive and distribute power to the system through a console power supply cable assembly 154. Other useful components include a console document printer assembly 155, shown in FIG. 31, and a console document scanner assembly 156 to provide enhanced data input/output.

System Backpack Apparatus 7.0

As shown in FIGS. 27–29, a preferred embodiment of the current invention incorporates a highly mobile one-person man portable system backpack apparatus 7.0. System backpack apparatus 7.0 comprises an internal space for several UAVs 10.0 of the present invention, and/or various spares, sensors, and mission payloads. System backpack apparatus 7.0 preferably comprises a rigid support frame assembly 157 with recessed carrying handles 158, padded waist belt 159, shoulder straps 160, a rigid exterior shell 161 and at least one extendible backpack mounted RF and GPS antenna assembly 162.

Multiple Launch Station Apparatus 8.0

Figure 34:
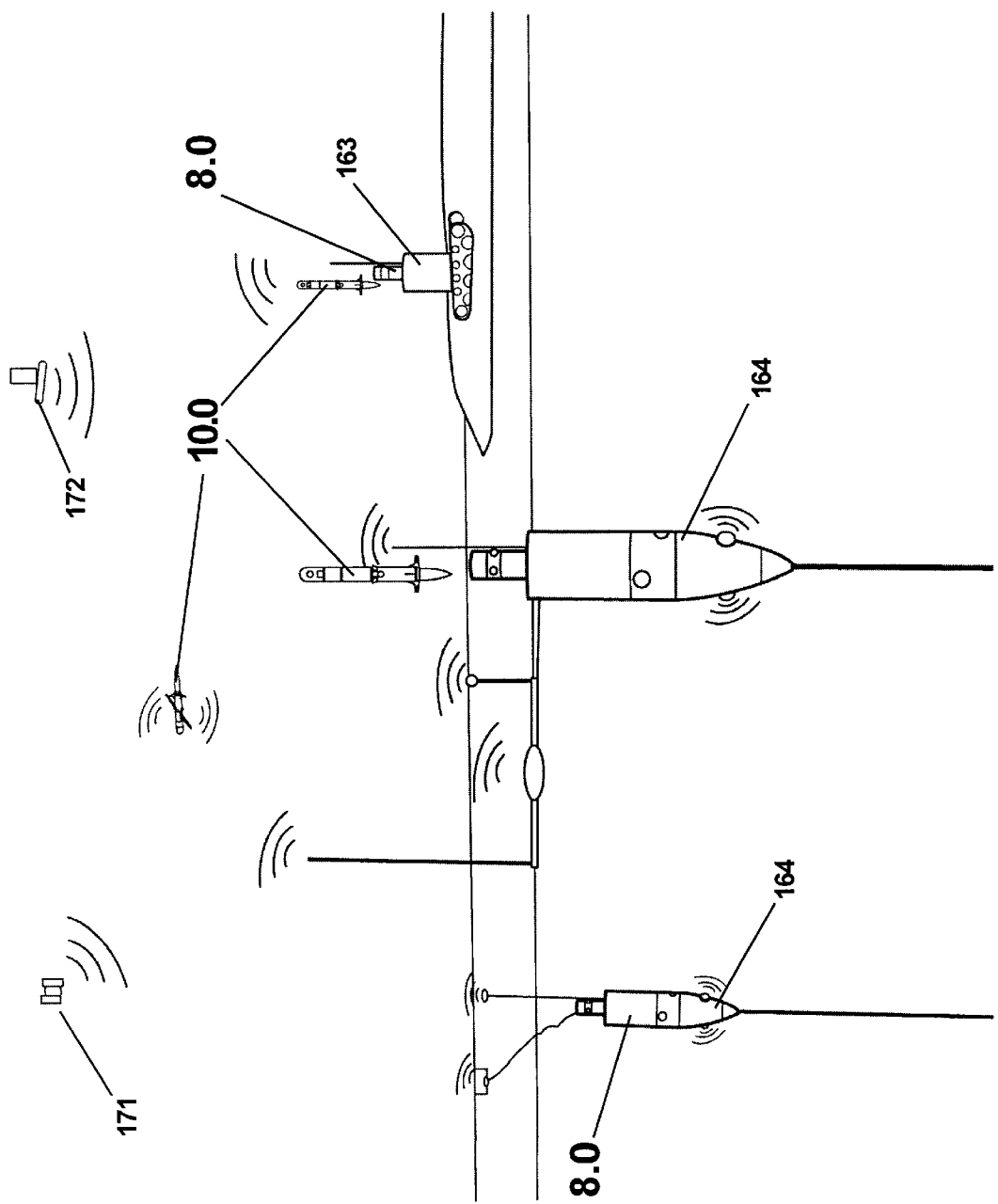
FIG. 34 is a depiction of a terrestrial based, and a marine based remote, multiple sonotube compatible launch and telemetry stations for a UAV of the present invention.
Figure 35:
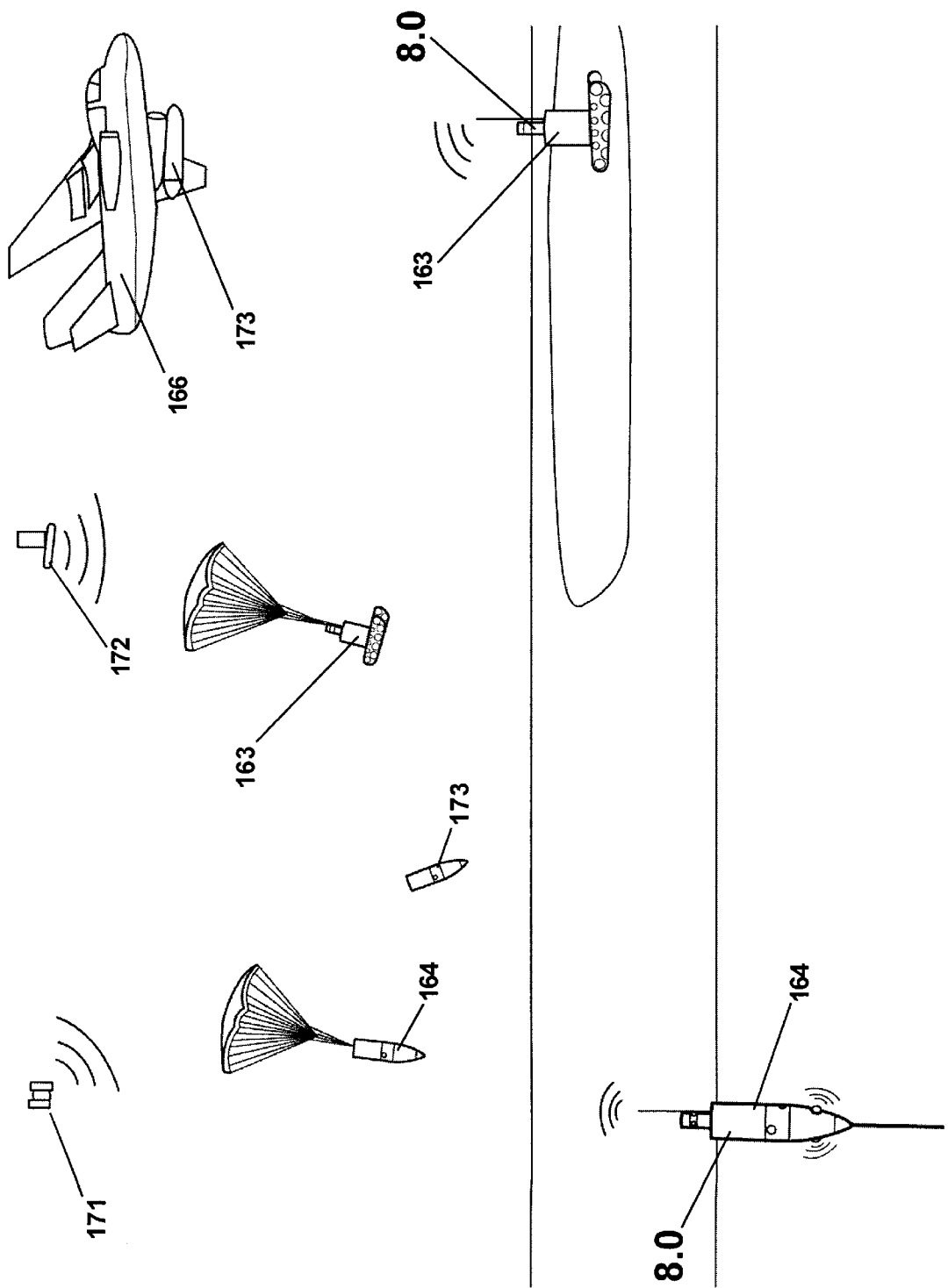
FIG. 35 is a depiction of a mobile track assembly with a terrestrial multiple remote launch station and a marine multiple remote launch station for a UAV of the present invention, including a standard deployable F-18 fuel tank type drop casing with parafoil assemblies mounted on a Lockheed S-3 Viking with external delivery hardpoint systems.

A preferred embodiment of the current invention incorporates a terrestrial and marine based multiple launch station apparatus 8.0 comprising either a terrestrial launch and telemetry station apparatus 163, or a marine launch and telemetry station apparatus 164, shown in FIGS. 34 and 35. Terrestrial launch and telemetry station apparatus 163 may be an adaptation of various crawler robots developed by the University of New Mexico, Sandia Labs, DARPA, or the United States Army and Navy Research and Development Labs. Marine launch and telemetry station apparatus 164 may be an adaptation of existing Remotely Operated Vehicle (ROV) and autonomous marine vehicle designs produced, for example, by International Submarine Engineering Ltd. For example, the existing Thesius autonomous underwater vehicle measuring 36 feet long, or the existing Dolphin autonomous underwater vehicle measuring 20 feet long could be adapted with a payload launch section to launch multiple UAVs and remain on station for prolonged periods of time surfacing only to launch the UAV.

Air deployment may be enabled by adapting existing EDO Ltd. or Brunswick Ltd. F-18 disposable fuel tank casings typical of those in use with the Canadian Department of Defense and the Unites States navy. Several UAVs 10.0 may be air deployed by use of multiple launchers suitably arranged.

Method Of Operation

The method of operation is described with reference to FIGS. 27–43. In a preferred embodiment of the current invention, the UAV is man portable and can be launched from a variety of platforms and in a wide range of environments. While most functions and operations are common to all the platforms and environments, the discussion below will discuss the major operations separately, with reference to the above discussed preferred embodiments of individual components.

System Backpack Apparatus Operation

In the event of an natural disaster or other crisis or emergency, the UAV 10.0 of the present invention may be transported by a single soldier, police officer, fire fighter, or other emergency worker or peace officer by way of a man portable system backpack apparatus 7.0. Alternatively, UAV 10.0 may simply be transported individually in its launch canister apparatus 5.0. Once the system operator reaches the launch site, the operator would extend the extendible leg assemblies 135 and erect the apparatus into position for launch.

After the launch canister apparatus 5.0 is set up, the operator would then extend the antenna(s) from system backpack apparatus 7.0 and remove and position the C4I assembly 6.0 with its related equipment, antennas, and operating components as discussed above for RF or satellite-based communications. If using a vehicle-based deployment platform, or if a ground-based hardwired telephone system is available, a hardwired data relay could be established by connecting data relay cable assembly 151, console antenna cable 152, and related connections and equipment as discussed above.

The operator would then establish and verify at least two different telemetry links with the vehicle through a spread spectrum encryption system to ensure telemetry continuity with the UAV 10.0 and further conduct a prelaunch diagnostic check of the vehicle and its various sensors and payload systems. The operator would conduct a computer-based analysis of the payload, vehicle length, and weight of the UAV 10.0 to determine minimum flight speed, and deployment sequence of the main wing assemblies. The operator would then establish various RF and satellite-based telemetry links with other designated control points, or data recipients in the field which may be using SSB, cellular phones or other mobile or fixed communications systems which are dependent on raw or processed data from the C4I assembly 6.0.

Once telemetry links have been established, and the prelaunch diagnostics are complete, the terrestrial launch of the UAV 10.0 is initiated by starting the Sophia J-450 series micro turbojet engine. The turbojet engine is started by releasing high pressure gas contained within the engine starting compressed air cylinder assembly 116 increasing engine RPM to the point where the fuel system N2 compressed gas cartridge assembly 117 can pressurize the fuel system and ignite the jet fuel with launch spark initiator 97. Once ignition and cruise engine thrust have been reached, RATO launch rockets 118 are ignited. Ignition is initiated to all RATO launch rockets substantially simultaneously to lift the vehicle out of the sonotube launch canister apparatus 5.0. A more rapid launch scenario could also be initiated without a cruise engine pre-start sequence. The cruise engine pre-start could be undertaken while the vehicle is in flight and under RATO launch rocket propulsion.

Once the UAV 10.0 leaves the sonotube launch canister, the axially-arrayed control fin assemblies 121 are deployed which effect initial control and stability of the vehicle until it has reached minimum altitude, generally about 200 feet, and minimum flight speed, generally about stall speed plus 15 knots. Once minimum altitude and speed are reached, wing deployment lock actuator assembly 70 is released to begin the deployment sequence for inboard wing 71, outboard wing 74, and Whitcomb-type winglets 76. Generally, once the main wing assemblies are deployed, the RATO launch rockets expire, leaving only the Sophia J-450 series turbojet engine to provide flight cruising thrust.

It is understood that minimum altitude and flight speed for wing deployment is dynamic, and will change due to the field configurable mission attributes of the system which affect the flight characteristics of the vehicle. These changes in performance are brought about by mission attributes which may necessitate the installation of various payload packages and assemblies which may change the overall length of the vehicle, and the center of gravity. Further, high or low speed flights may be necessary and designed for with corresponding wing configurations.

Submarine Launch Operation

Figure 36:
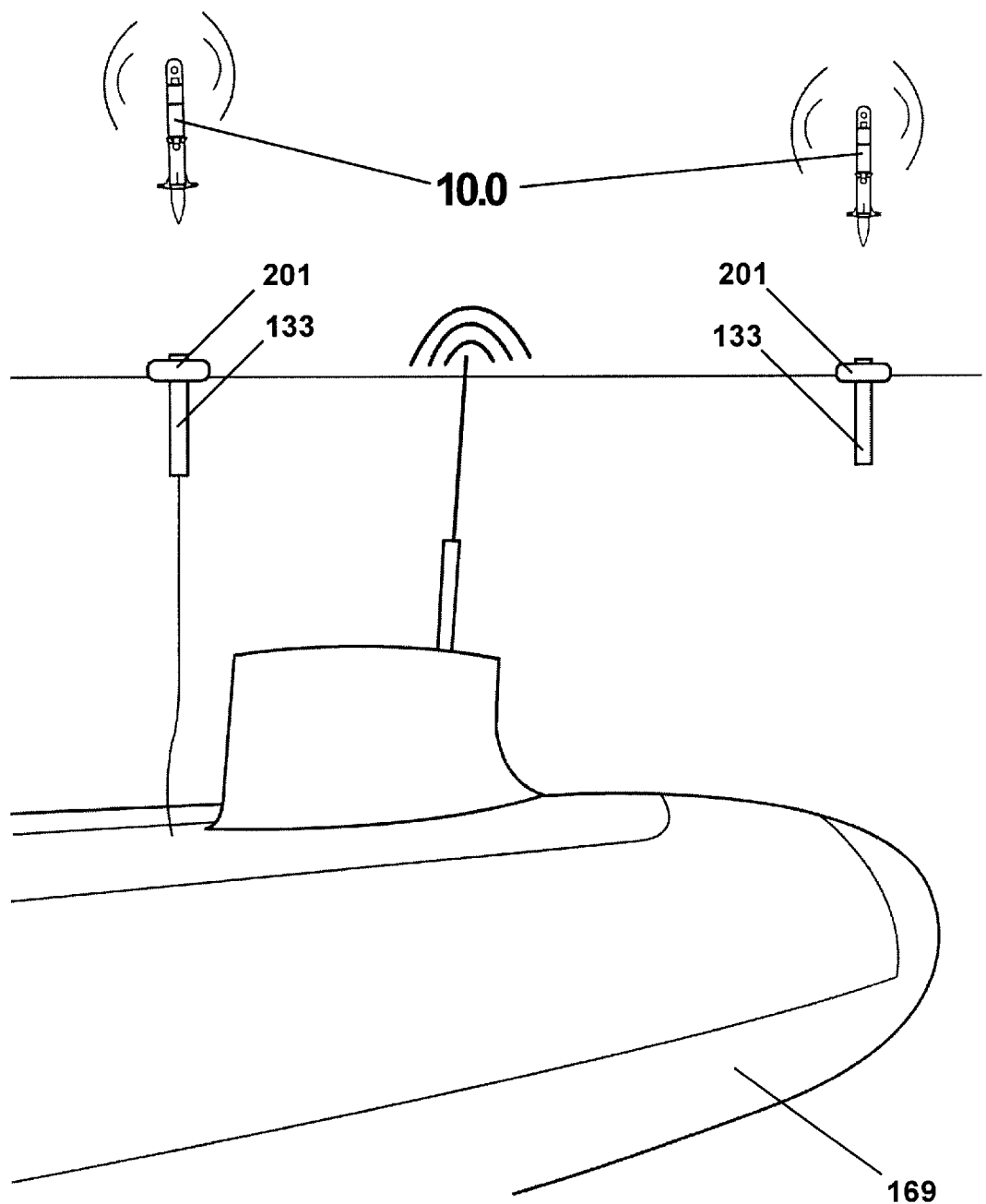
FIG. 36 is a depiction of a submarine launch scenario of a UAV of the present invention.

As depicted in FIG. 36, a UAV 10.0 of the present invention may be launched from a submarine, for example, a U.S. Navy Sea Wolf Submarine 169 and would not include a cruise engine pre-launch ignition. A submarine launch sequence is similar to a terrestrial land launch with one exception being that the prelaunch diagnostics are undertaken prior to ejecting the sonotube launch canister tube assembly 133 from submarine 169 or alternatively may be launched without a hardwired antenna lead provided the submarine 169 has an alternate antenna attached to its periscope assemble or some other part of the submarine which can be floated above to the surface to effect telemetry. It is contemplated that RF or other satellite antenna may be employed, thereby making the hardwire connection unnecessary.

While in a submerged state, a modified sonotube launch canister tube assembly 133 is used in conjunction with a hardwired antenna lead connecting sonotube launch canister tube assembly 133 with submarine 169. Upon ejection from the submarine's type "A", "B", or "C" sonobuoy or other suitable orifice, the sonotube launch canister tube assembly 133 deploys a floatation collar 201, which provides buoyancy and stability in a vertical launch position once the vehicle 10.0 and sonotube launch canister tube assembly 133 reach the surface. Floatation collar 201 is typical of those manufactured by Devtek of Halifax, Nova Scotia, or Spartan Electronics of Michigan, USA. Sonotube launch canister tube assembly 133 may also employ a satellite-based flat patch electronically steered antenna array similar to those manufactured by Galaxis USA, attached to floatation collar 201.

When sonotube launch canister tube assembly 133 reaches the surface, waterproof sonotube launch canister tube lock cap 137 is jettisoned in preparation for launch. A thin non-permeable membrane may cover the canister launch orifice to prevent unwanted water from entering in. After launch, the Sophia J-450 series turbojet engine is ignited approximately three seconds after the RATO launch rockets to ensure approximately 50 feet of clearance from the water surface before the cruise engine begins to spool up and intake compressor air.

The entire launch sequence for a submarine-based launch takes approximately 20 seconds to reach the point where the vehicle is flying under the power of its cruise engine after the waterproof sonotube launch canister tube lock cap 137 is jettisoned. It is envisioned, but not essential, that the deployment of launch sequence take place within 100 feet of the surface, but submarine launches, or similar sub surface stationary structure launches could be initiated from substantially greater depths.

Airborne Launch Operation

Figure 37:
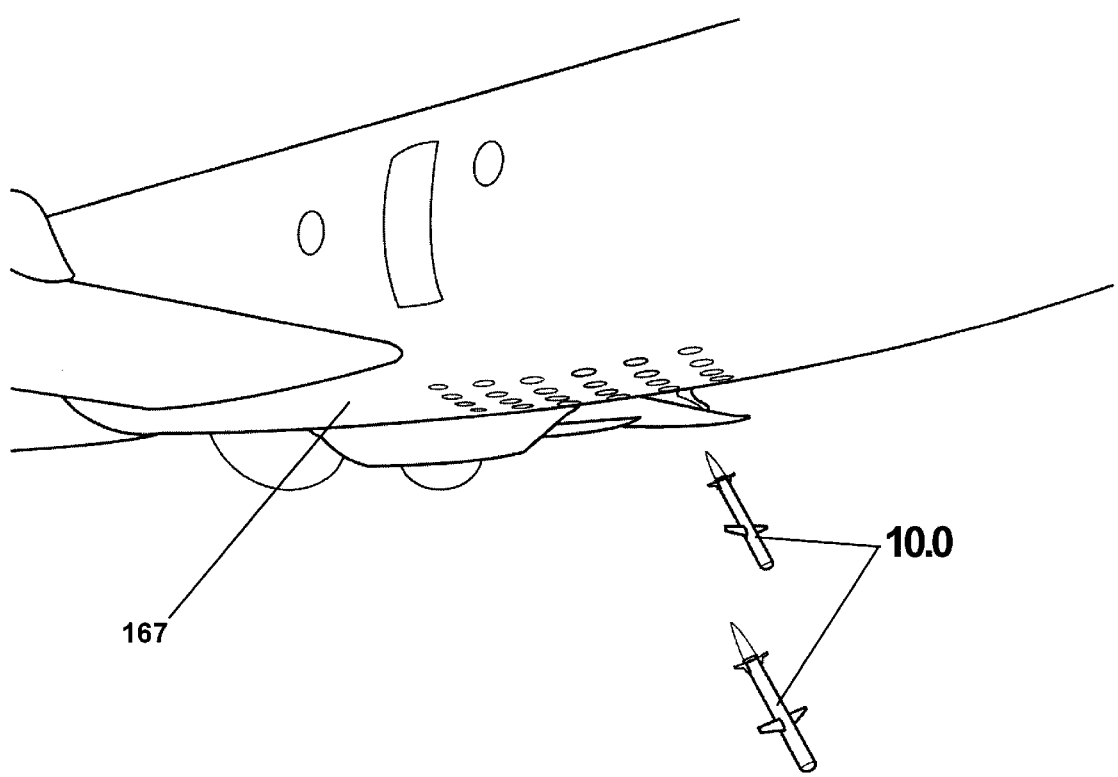
FIG. 37 is a depiction of a Lockheed-Martin P-3 Orion maritime patrol aircraft launch scenario deploying UAVs of the present invention.
Figure 39:
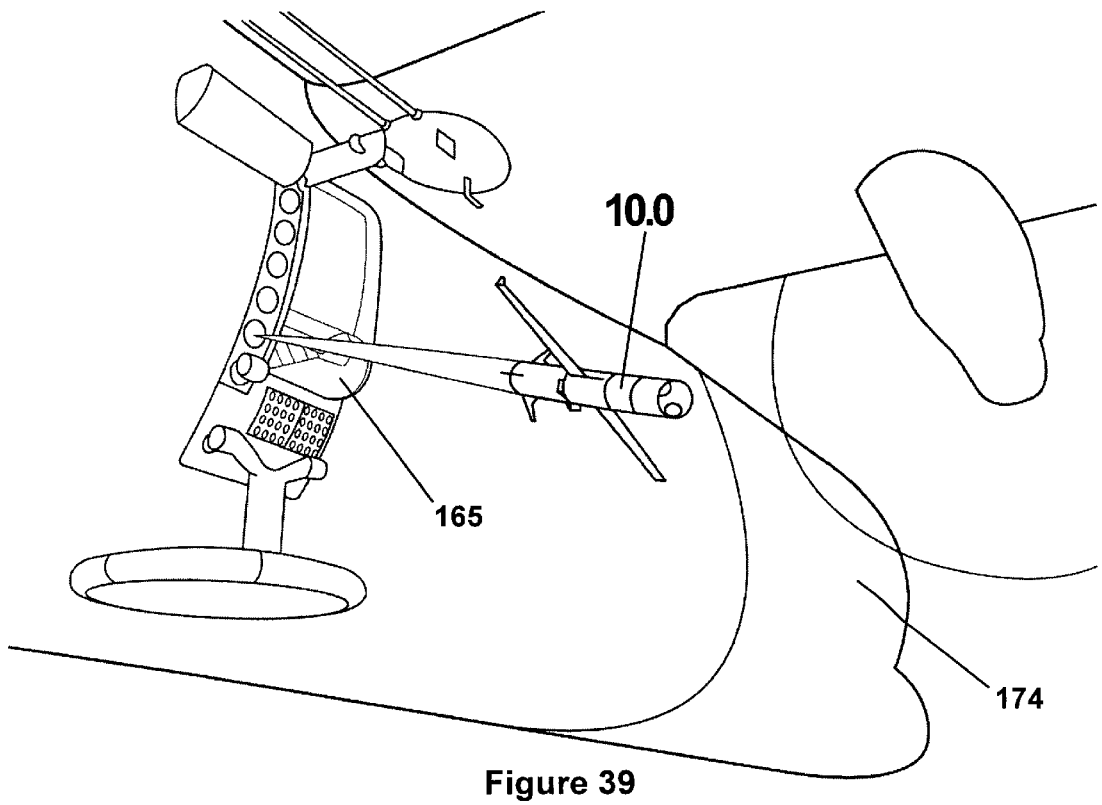
FIG. 39 is a perspective view of a Lockheed C-130 Hercules aircraft launch scenario of a UAV of the present invention from a side door sonotube launch system.

As shown in FIG. 37, the UAV 10.0 may also be launched from an aircraft which is equipped with sonotube ejection systems, such as, for example, a Lockheed P-3 Orion 167, a Lockheed S-3 Viking 166, shown in FIG. 35, or an SH-60 Sikorsky Naval helicopter. The UAV of the present invention may also be launched in large numbers from a Lockheed-Martin C-130 174 by means of a SEAPAL C-130 door mounted launch system 165, as shown in FIG. 39. SEAPAL C-130 door mounted launch system 165 forms a part of the Aircraft Based Sensing, Detection, Targeting, Communications and Response Apparatus, as disclosed in U.S. patent application Ser. No. 08/731,684, filed on Oct. 17, 1996 by Richard L. K. Woodland, and hereby incorporated herein by reference.

An aircraft launch sequence is similar to a terrestrial land launch with one exception being that the prelaunch diagnostics are undertaken prior to ejecting the UAV. Aircraft launch systems also may not require a sonotube launch canister tube assembly 133, but rather use an electrical firing and mechanical ejection system of existing design employed on most free world naval patrol aircraft.

Upon ejection from the aircraft's type "A", "B", or "C" sonobuoy or other orifice, ignition of the RATO launch rockets is initiated to provide propulsion until cruise flight is reached. It is envisioned, but not essential, that the deployment and launch sequence take place at least 500 feet above the ground or water surface. However, lower altitude launches could be initiated by using a preprogrammed launch and flight sequence which establishes a specific altitude immediately after launch and maintains such altitude under RATO launch rocket power until the cruise engine support powered flight.

Figure 38:
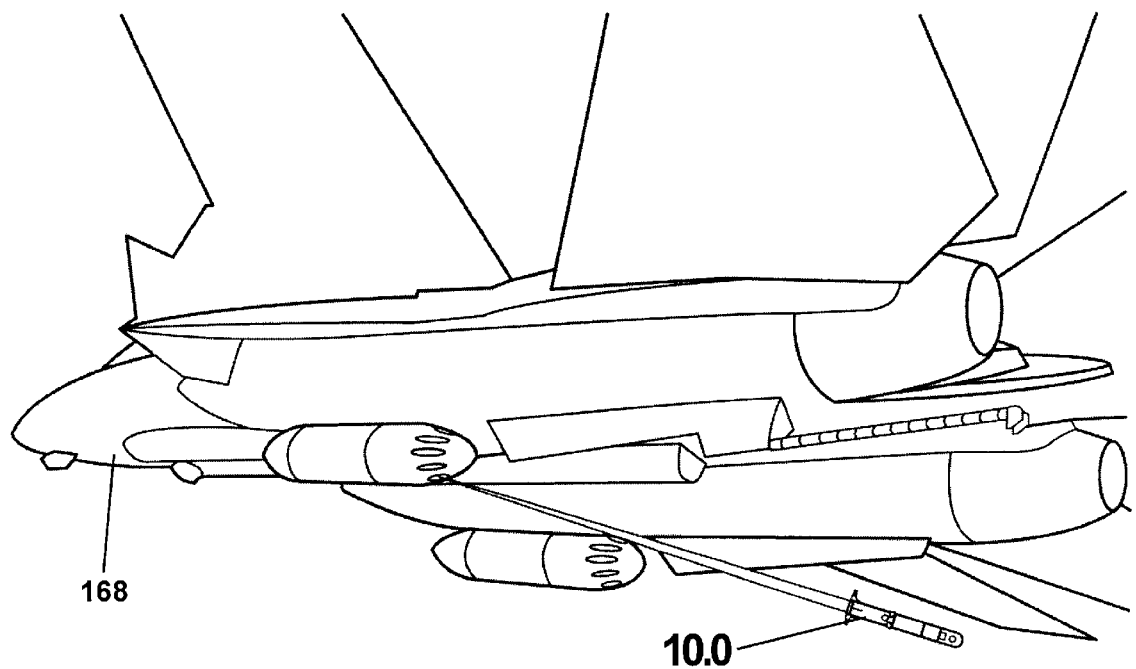
FIG. 38 is a perspective view of a Grumman F-14 aircraft mounted sectional fuel tank launching a UAV of the present invention.

As depicted in FIG. 38, UAVs 10.0 may also be air launched from externally mounted aircraft or helicopter hardpoint assemblies. For example, an aerodynamic fuel cylinder may be modified with the rear section accommodating a flechette arrangement of launch orifices for a number of UAVs. As shown, deployment may be from a U.S. Navy Grumman F-14 Tomcat fighter which is carrying two modified external fuel cylinders in an ITALD or MALD application. Additionally, launch may be effected by use of sectional BR-11, BRU-14, or TER-7 aerodynamically certified fuel tanks with rear launch capabilities.

In Flight Operations

Once the UAV 10.0 is in flight under the power of its cruise engine, stability is achieved by the inertial GPS-based navigation system 19. Inertial GPS-based navigation system 19 also acts in conjunction with other flight sensors to process dynamic GPS and other positional data which guides the vehicle on a preprogrammed or, more preferably, a semi autonomous or autonomous course of flight. By "autonomous" flight is meant flight operations which utilize a real time artificially intelligent expert system that enables the vehicle to undertake mission programming, both predefined and dynamic in conjunction with self preservation, self maintenance, and which is able to respond to opportunities or threats encountered in the course of its mission without human assistance. The autonomous vehicle preferably uses a preemptive scheduler with error code programming. An example of such an expert system is those designed and utilized by International Submarine Engineering, Ltd. (ISE) on the ARCS, DOLPHIN, and THESIUS autonomous underwater vehicles. By "semi-autonomous" flight is meant flight which has partial autonomous capability with an ability to be manipulated or directly controlled by a system operator.

By way of example, under autonomous flight UAV 10.0 can respond to dynamic influences when on-board mission or navigational sensors detect anomalies or other irregularities suggesting or requiring response. In response, system computer 15 may re-prioritize mission activities in a fashion similar to U.S. Navy S-3 manned aircraft operation where the Tactical Officer (TACO) regularly retasks the aircraft pilot and directs aircraft operation when the mission requires it. Similarly, upon receipt of dynamic data, the systems computer 15 of the UAV 10.0 implements higher response protocols over lower mission programming to respond to an opportunity or avoid a threat. A threat may be a navigational obstacle such as other aircraft, for example. An example of an opportunity is detection of a trace chemical, such as used in Sarin Gas, which would warrant synoptic sampling of an unprogrammed area to determine the size and configuration of a gas cloud. Additionally, an opportunity could be characterized as an image which is identified by an image recognition chip similar to existing technologies developed by Litton Electronics Ltd. which may be programmed to recognize up to 3,000 images and autonomously identify such objects as, for example, illegal aliens, drug smuggling boats, and Scud missile launchers.

With reference to FIGS. 2, 34 and 35, telemetry of flight, positional, or sensor data, to and from C4I assembly 6.0 is preferably achieved by a satellite transceiver telemetry card 22, and a satellite telemetry antenna 24. Telemetry equipment is used to relay and receive data over the horizon and beyond the line of sight by means of satellites 171 and 172. Alternatively, as a complementary and redundant system, data can also be sent or received by means of an RF transceiver telemetry card 23 which is transmitted over a trailing or fixed RF antenna 25 to effect line of sight-based control. In either telemetry mode, the preferred method of transmission will utilize some form of spread spectrum and data burst methodology familiar to those skilled in the art for purposes of providing uninterrupted telemetry. Under certain military or policing operations, covert or undetectable operations of the overall system are enabled by the above-described telemetry methods.

In the event the UAV 10.0 cannot establish the preferred telemetry link, a number of autonomous protocols can be initiated which direct and control the vehicle. For example, autonomous control could return the vehicle to its GPS designated point of launch or an alternate predetermined GPS coordinate. Autonomous control could also instruct the vehicle to achieve a higher altitude to re-initiate RF telemetry, or to achieve its mission programming autonomously. In a critical situation autonomous control could initiate system shutdown and deploy the recovery parachute 87. The preferred autonomous software and system is manufactured by International Submarine Engineering Ltd. (ISE)

and well documented in relation to the operation of ARCS, DOLPHIN, and THESIUS autonomous underwater vehicles which must function in similar three-dimensional environment.

Other Launch Configurations

Figure 40:
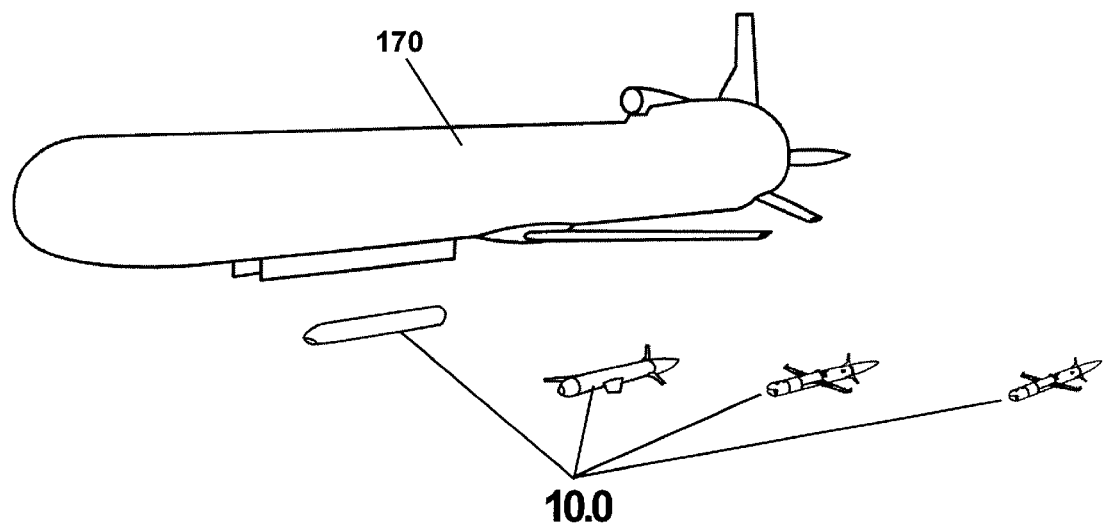
FIG. 40 is a perspective view of a cruise missile of the Boeing AGM-86 B/C series acting in the capacity of a carrier UAV deploying several variations of a UAV of the present invention.

As shown in FIG. 40, a preferred embodiment of the present invention also may be launched from other UAVs, for example, a Boeing AGM-86 B/C cruise missile 170. Other UAVs modifiable for use with the UAV 10.0 of the present invention include, but are not limited to, the General Atomics Prowler or Predator, the Alliant Systems Mi-Tex Hellfox, or the Teledyne Ryan-Global Hawk (Tier II+). The launch sequence would be similar to those developed for other aircraft platforms previously described with at least one exception being that the UAV 10.0 of the present invention can also be launched from more conventional specialized rack assemblies or modified rotary launcher mechanisms of existing design.

As shown in FIGS. 34 and 35, the UAV 10.0 may be deployed in a clustered configuration with either a terrestrial launch and telemetry station apparatus 163, or a marine launch and telemetry station apparatus 164. Clustered configurations may be used in combination with monitoring activities under a more covert type of operating environment utilizing GPS satellite means 171, or telemetry satellite means 172, to effect positioning and data relay.

Clustered configurations may be air deployed from an aircraft such as a U.S. Navy Lockheed S-3 Viking using a modified F-18 fuel cylinder casing 173. Deployment components includes a standoff delivery system incorporating an SSE GPS guided parafoil delivery system with a representative capability of deploying equipment from over twenty miles away to within 300 feet of a designated touchdown point.

Once terrestrial launch and telemetry station apparatus 163 or marine launch and telemetry station apparatus 164 are on site, they are preferably equipped with mobility, sensors, RF and satellite telemetry means, and several UAVs 10.0, which may then be launched according to the previously disclose methodologies. Mobility may be provided for terrestrial launch and telemetry station apparatus 163 by means of collapsible track or wheel assemblies to provide terrestrial mobility and positioning.

Marine launch and telemetry station apparatus 164 is capable of both submerged and surface launches. Both terrestrial and marine launch and telemetry stations are preferably capable of sustained autonomous operations for over 90 days and can receive retasking instructions to relocate, launch, or engage in surface-based surveillance using on-board sensor systems by satellite or RF telemetry means. A preferred embodiment also incorporates predefined programming which keeps the marine launch and telemetry station apparatus 164 dormant until a certain time when the unit surfaces and becomes active as in the case of monitoring suspected illegal immigration or drug smuggling routes.

Marine launch and telemetry station apparatus 164 comprises a number of depth rated marinized launch canisters arrayed in a circular pattern around a general support frame to house various configurations of the UAV apparatus of the present invention. The apparatus preferably comprises additional sonar detection and obstacle avoidance systems, and submersible ballast assemblies.

Figure 41:
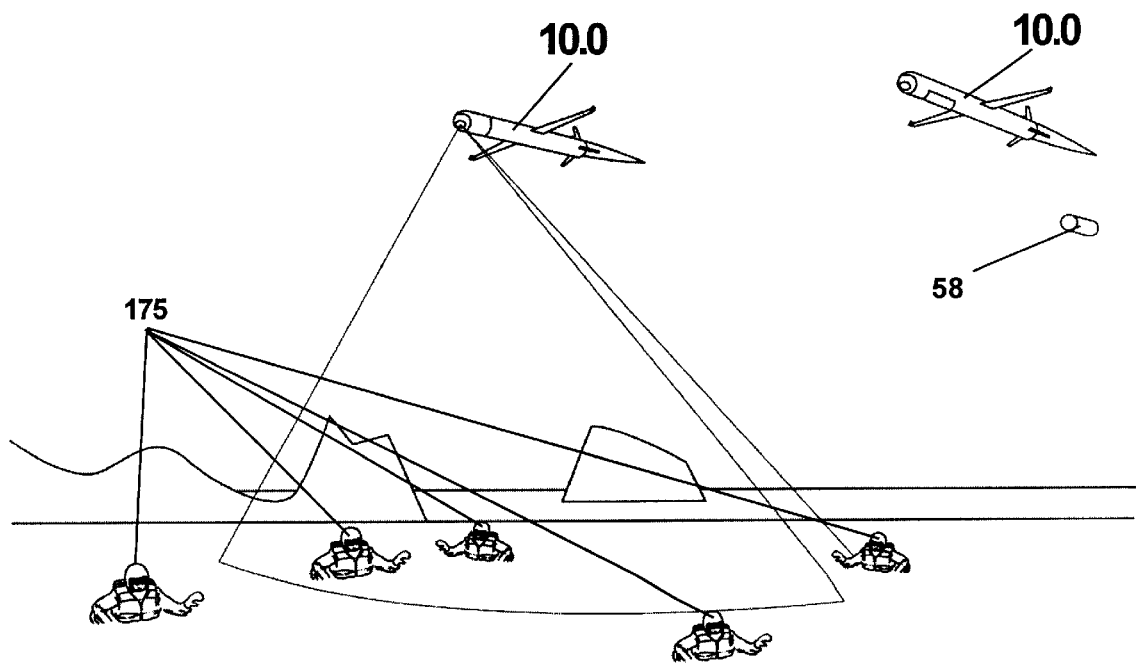
FIG. 41 is a perspective view of a search and rescue scene involving multiple persons in peril and UAVs of the present invention deploying rescue items.

As shown in FIG. 41, the UAV 10.0 may be deployed from a variety of platforms in the capacity of a delivery vehicle which may deliver various sensors, communications or other material comparable to, for example, single-person liferaft assemblies 58, or multiple person life-saving floatation products to persons in peril 175. Similar life-saving products or other essential items could be delivered in a similar manner to persons in otherwise remote or inaccessible terrestrial locations as well.

Figure 42:
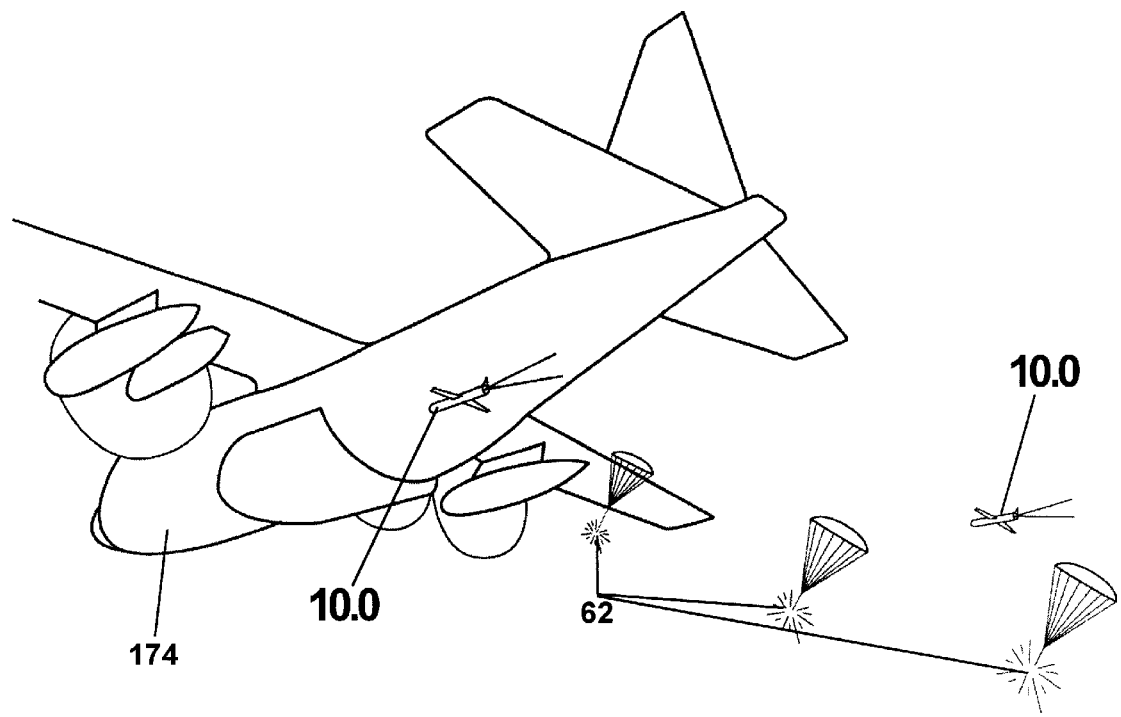
FIG. 42 is a perspective view of a Lockheed-Martin C-130 Hercules aircraft with two UAVs of the present invention flying close proximity patrol for missile countermeasures.

As shown in FIG. 42, the UAV 10.0 may be deployed from a Lockheed-Martin C-130 174, or other suitable aircraft, ground, or sea-based deployment asset, and subsequently attached by programming to a particular aircraft to effect a more precise thermal or radar detection, deception, and neutralization effort of hostile missile and radar direct ground fire in a preemptive fashion.

Figure 43:
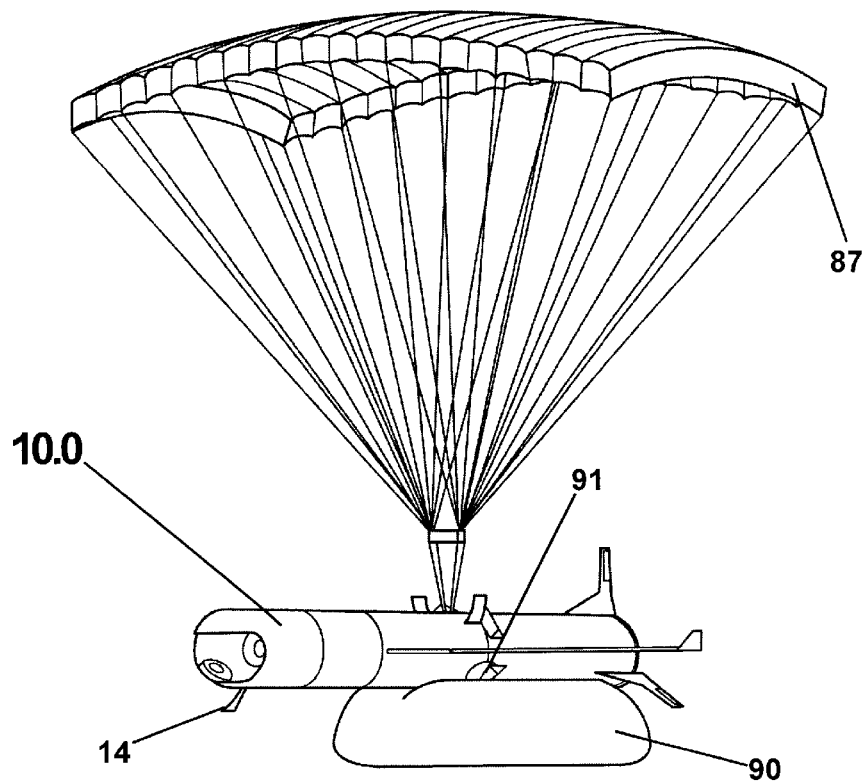
FIG. 43 is a perspective view of a UAV of the present invention in descent.

As shown in FIG. 43, the UAV 10.0 of the present invention preferably utilizes a self-contained parafoil descent system which is deployed after completing the object mission or after on-board systems detect severe damage resulting in unstable operation. Deployment of recovery parachute 87 may also be effected by manual instruction from the system operator. Parachute 87 preferably comprises a 22-square-foot parafoil which provides an acceptable 20-foot-per-second descent rate, well within established parameters of the U.S. Army. The descent system preferably comprises a recovery impact bag assembly 90 which is released and activated prior to touchdown by recovery impact bag door(s) and lock actuator assemblies 91, which may be of existing design as used on currently-existing UAVs. Additionally, prior to touchdown, a nose cone impact skid assembly 14 is deployed to protect vital sensors located within the nose section.

While particular embodiments of the present invention have been illustrated and described, it would be obvious to those skilled in the art that various other changes and modification can be made without departing from the spirit and scope of the present invention. The foregoing is therefore intended to cover in the appended claims all such changes and modifications that are within the scope of the present invention.

I claim:

1. A sonotube compatible unmanned aerial vehicle having an airframe comprising adjacent sections, said sections comprising:
   a) a nose section;
   b) a payload section attached to said nose section, said payload section housing at least one deployable payload;
   c) a wing and fuel tank section attached to said payload section; and
   d) a powerplant section attached to said wing and fuel tank section.

2. An unmanned aerial vehicle of claim 1, wherein said adjacent sections of said airframe are modular, such that each section may be replaced by similar sections having alternative configurations and capabilities.

3. An unmanned aerial vehicle of claim 1, wherein said nose section comprises electronic sensors.

4. An unmanned aerial vehicle of claim 3, wherein said sensors comprise at least one optical sensor.

5. An unmanned aerial vehicle of claim 3, wherein said sensors comprise at least one non-optical sensor.

6. An unmanned aerial vehicle of claim 1, wherein said nose section comprises at least one gimbal-mounted sensor.

7. An unmanned aerial vehicle of claim 1, wherein said wing and fuel tank section comprises retractable wings.

8. An unmanned aerial vehicle of claim 7, wherein said wings are field configurable such that said wings may be adapted for a range of flight requirements.

9. An unmanned aerial vehicle of claim 7, wherein said wings comprise at least one integrated flat patch steered antenna array.

10. An unmanned aerial vehicle of claim 1, wherein said powerplant section comprises a turbojet engine.

11. An unmanned aerial vehicle of claim 1, wherein said powerplant section comprises means for rocket-assisted launch.

12. An unmanned aerial vehicle of claim 1,
wherein said unmanned aerial vehicle comprises means for airborne launch of said unmanned aerial vehicle.

13. A sonotube compatible unmanned aerial vehicle having an airframe comprising adjacent sections, said sections comprising:
 a) a nose section;
 b) a payload section attached to said nose section;
 c) a wing and fuel tank section attached to said payload section;
 d) a powerplant section attached to said wing and fuel tank section; and
wherein said unmanned aerial vehicle is capable of man portable ballistic launch.

14. An unmanned aerial vehicle of claim 13 said adjacent sections are in electrical communication by means of at least one power and data relay conduit.

15. An unmanned aerial vehicle of claim 13, wherein said adjacent sections are attached by water-tight threaded sealing means.

16. An unmanned aerial vehicle of claim 13, wherein said airframe comprises at least one integrated antenna array.

17. An unmanned aerial vehicle of claim 13, wherein said payload section comprises at least one rotary payload launcher.

18. An unmanned aerial vehicle of claim 13, wherein said payload section is adapted for storing and deploying payloads.

19. An unmanned aerial vehicle of claim 18, wherein said payloads comprise at least one terrestrial sensor.

20. An unmanned aerial vehicle of claim 18, wherein said payloads comprise at least one marine sensor.

21. An unmanned aerial vehicle of claim 18, wherein said payloads comprise at least one spider robot.

22. An unmanned aerial vehicle of claim 18, wherein said payloads comprise at least one optical sensor.

23. An unmanned aerial vehicle of claim 18, wherein said payloads comprise at least one antenna.

24. An unmanned aerial vehicle of claim 13, wherein said powerplant section comprises a plurality of extendible axially-arrayed control fins.

25. An unmanned aerial vehicle of claim 13, wherein said powerplant section comprises a tailpipe and a ceramic heat shield and accessories arrayed around said tailpipe.

26. A system for launching a sonotube compatible unmanned aerial vehicle having an airframe comprising adjacent sections, said sections comprising:
 a) a nose section;
 b) a payload section attached to said nose section;
 c) a wing and fuel tank section attached to said payload section; and
 d) a powerplant section attached to said wing and fuel tank section;
wherein said system comprises:
 a sonotube compatible launch canister having exhaust orifices, extendible legs and a carrying strap;
 a sonotube compatible backpack assembly having at least one spare unmanned aerial vehicle, at least one RF antenna, and at least one GPS antenna; and
 a portable C4I control station.

* * * * *